United States Patent
Pan et al.

(10) Patent No.: US 10,466,348 B2
(45) Date of Patent: Nov. 5, 2019

(54) POSITION ACQUISITION METHOD AND APPARATUS

(71) Applicant: SHANG HAI PAN SHI TOU ZI GUAN LI YOU XIAN GONG SI, Shanghai (CN)

(72) Inventors: ZhongGuang Pan, Shanghai (CN); YanMei Teng, Beijing (CN); YuYong Gao, Beijing (CN); SiCheng Yang, Beijing (CN)

(73) Assignee: SHANG HAI PAN SHI TOU ZI GUAN LI YOU XIAN GONG SI, Shanghai (CN)

( * ) Notice: Subject to any disclaimer, the term of this patent is extended or adjusted under 35 U.S.C. 154(b) by 212 days.

(21) Appl. No.: 15/379,333

(22) Filed: Dec. 14, 2016

(65) Prior Publication Data
US 2017/0307747 A1  Oct. 26, 2017

(30) Foreign Application Priority Data
Apr. 22, 2016  (CN) .......................... 2016 1 0256647

(51) Int. Cl.
*G01S 13/46* (2006.01)
*G01S 5/14* (2006.01)
(Continued)

(52) U.S. Cl.
CPC ............ *G01S 13/46* (2013.01); *G01S 5/0268* (2013.01); *G01S 5/14* (2013.01); *G01S 19/01* (2013.01); *H04W 64/00* (2013.01); *G01S 5/021* (2013.01)

(58) Field of Classification Search
CPC ... H04W 4/023; H04W 4/043; G06Q 30/0639
See application file for complete search history.

(56) References Cited

U.S. PATENT DOCUMENTS 6,526,283 B1  2/2003  Jang
8,717,952 B2  5/2014  Hibara et al.
(Continued)

FOREIGN PATENT DOCUMENTS

CN  104299016 A  1/2015
CN  104793183 A  7/2015
(Continued)

OTHER PUBLICATIONS

Tarrio, P., et al., "Weighted Least Squares Techniques for Improved Received Signal Strength Based Localization," Sensor, vol. 11, No. 9, pp. 8569-8592 (Sep. 2, 2011).
(Continued)

*Primary Examiner* — Stephanie E Bloss
(74) *Attorney, Agent, or Firm* — Maschoff Brennan

(57) ABSTRACT

The present application discloses a position acquisition method and a position acquisition apparatus. The method includes: selecting at least one group of N effective devices from known devices that transmit signals to a target device or known devices that receive signals transmitted by the target device; adjusting a numerical value of a conversion scaling factor with respect to each group of N effective devices, and seeking a corrected value of the conversion scaling factor; wherein the conversion scaling factor is used to convert a signal intensity of the signal transmitted by the effective device towards the target device or the received signal transmitted by the target device into a distance; and calculating and acquiring a position of the target device by using at least one corrected value of the conversion scaling factor acquired. Position acquisition accuracy is improved through the embodiments of the present application.

18 Claims, 14 Drawing Sheets

(51) Int. Cl.
*H04W 64/00* (2009.01)
*G01S 19/01* (2010.01)
*G01S 5/02* (2010.01)

(56) References Cited

U.S. PATENT DOCUMENTS

| | | | | |
|---|---|---|---|---|
| 2011/0287778 | A1* | 11/2011 | Levin | G01S 5/0252 |
| | | | | 455/456.1 |
| 2012/0191512 | A1* | 7/2012 | Wuoti | G06Q 30/0207 |
| | | | | 705/14.1 |
| 2013/0257657 | A1* | 10/2013 | Garin | G01C 21/206 |
| | | | | 342/451 |
| 2015/0193982 | A1* | 7/2015 | Mihelich | H04W 4/026 |
| | | | | 345/633 |
| 2015/0271643 | A1 | 9/2015 | Jalali | |
| 2015/0288460 | A1* | 10/2015 | Cahalan | H04B 13/02 |
| | | | | 367/118 |
| 2015/0319572 | A1 | 11/2015 | Jalali et al. | |
| 2015/0338522 | A1* | 11/2015 | Miller | G01S 19/428 |
| | | | | 342/357.61 |
| 2016/0057565 | A1* | 2/2016 | Gold | H04L 67/12 |
| | | | | 455/41.1 |
| 2016/0077189 | A1* | 3/2016 | Elias | G01S 5/0263 |
| | | | | 455/456.6 |
| 2017/0030719 | A1 | 2/2017 | Ishida | |
| 2017/0034800 | A1* | 2/2017 | Abedini | H04W 56/0015 |

FOREIGN PATENT DOCUMENTS

| | | |
|---|---|---|
| CN | 104965193 A | 10/2015 |
| EP | 2 327 996 A1 | 6/2011 |
| JP | 2000-356672 A | 12/2000 |
| JP | 2002-142246 A | 5/2002 |
| JP | 2002-158606 A | 5/2002 |
| JP | 2004-053510 A | 2/2004 |
| JP | 2005-321231 A | 11/2005 |
| JP | 2009-074974 A | 4/2009 |
| JP | 2011-214920 A | 10/2011 |
| JP | 2016-048205 A | 4/2016 |
| KR | 11-2011-0059334 A | 6/2011 |
| TW | I407079 B | 9/2013 |
| TW | 201418750 A | 5/2014 |
| WO | 2007/072400 A2 | 6/2007 |
| WO | 2010/045466 A2 | 4/2010 |
| WO | 2015/097948 A1 | 7/2015 |

OTHER PUBLICATIONS

AU Office Action dated Mar. 4, 2018 as received in Application No. 2016262717.
CN Office Action dated Dec. 5, 2017 as received in Application No. 201610256647.X.
Extended European Search Report dated Jun. 26, 2017 as received in Application No. 16200865.0.
TW Office Action dated Nov. 27, 2017 as received in Application No. 105138390.
JP Office Action dated Dec. 19, 2017 as received in Application No. 2016-235471.
KR Office Action dated Jan. 18, 2018 as received in Application No. 10-2016-0156170.
Mazuelas, S., et al., "Robust Indoor Positioning Provided by Real-Time RSSU Values in Unmodified WLAN Newworks," IEEE Journal of Selected Topics in Signal Processing, vol. 3, Issue 5, pp. 821-831 (Oct. 20, 2009).
Pei-Qi, W., et al., "Localization algorithm for WSNs based on RSSI range modified," Transducer and Microsystem Technologies, vol. 33, Issue 5, pp. 135-140 (2014) (Abstract Only).

* cited by examiner

POSITION ACQUISITION METHOD AND APPARATUS

CROSS REFERENCE TO RELATED APPLICATIONS

This application claims priority under 35 U.S.C. § 119(a) to Chinese Patent Application No. 201610256647X, filed Apr. 22, 2016, the entire contents of which is hereby incorporated by reference.

TECHNICAL FIELD

The present application relates to the field of positioning technologies, and more particularly, to a position acquisition method and a position acquisition apparatus.

BACKGROUND

In an indoor environment, a satellite signal is weak while arriving at the ground and cannot penetrate through a building; therefore, satellite positioning cannot be used for positioning. But in practical application, positioning in the indoor environment, i.e., indoor positioning, is needed frequently, so as to facilitate indoor position management, monitoring or tracking, etc., for example, positioning shelves in a supermarket and an emporium, or the like; positioning or tracking positions of indoor devices in an electronic map; and implementing interaction between indoor electronic devices by mutually positioning the positions thereof, etc.

Among indoor positioning technologies at current, technologies like Wi-Fi, Bluetooth, infrared rays, ultra-wideband, RFID, ZigBee or ultrasound technology or the like are adopted usually to implement indoor positioning by using signal intensities transmitted among the devices. Specifically, the intensity of a signal transmitted between a target device with a position to be determined and a plurality of known devices with known positions is converted into a device distance between the target device and the known devices, so that the position of the target device can be calculated.

However, signal intensity errors may be caused by signal interference and design differences in antennas, circuits and housing of devices under different brands, which will lead to inaccurate position of the target device acquired.

SUMMARY

In light of this, a technical problem to be solved by the present application is to provide a position acquisition method and a position acquisition apparatus for solving the problem that the position acquisition is inaccurate in the prior art.

In order to solve the foregoing technical problem, the embodiments of the present application disclose a position acquisition method, including:

selecting at least one group of N effective devices from known devices that transmit signals to a target device or known devices that receive signals transmitted by the target device;

adjusting a numerical value of a conversion scaling factor with respect to each group of N effective devices, and seeking a corrected value of the conversion scaling factor, the corrected value enabling N circles or spheres formed by taking a position of each effective device as a center and a corrected distance between each effective device and the target device as a radius to have a unique intersection, wherein, the conversion scaling factor is used to convert a signal intensity of the signal transmitted by the effective device towards the target device or the received signal transmitted by the target device into a distance; and calculating and acquiring a position of the target device by using at least one corrected value of the conversion scaling factor acquired.

A position acquisition apparatus includes:

a device selection module configured to select at least one group of N effective devices from known devices that transmit signals to a target device or known devices that receive signals transmitted by the target device;

a correction module configured to adjust a numerical value of a conversion scaling factor with respect to each group of N effective devices, and seek a corrected value of the conversion scaling factor, the corrected value enabling N circles or spheres formed by taking a position of each effective device as a center and a corrected distance between each effective device and the target device as a radius to have a unique intersection, wherein, the conversion scaling factor is used to convert a signal intensity of the signal transmitted by the effective device towards the target device or the received signal transmitted by the target device into a distance; and a position acquisition module configured to calculate and acquire a position of the target device by using at least one corrected value of the conversion scaling factor acquired.

Compared with the prior art, the technical effects that may be obtained by the present application include:

selecting at least one group of N effective devices from known devices that transmit signals to a target device or known devices that receive signals transmitted by the target device; adjusting a numerical value of a conversion scaling factor with respect to each group of N effective devices, and seeking a corrected value of the conversion scaling factor, the corrected value enabling N circles or spheres formed by taking a position of each effective device as a center and a corrected distance between each effective device and the target device as a radius to have a unique intersection, wherein, the conversion scaling factor is used to convert a signal intensity of the signal transmitted by the effective device towards the target device or the received signal transmitted by the target device into a distance; and calculating and acquiring a position of the target device by using at least one corrected value of the conversion scaling factor acquired. The embodiment of the present application improves the position acquisition accuracy of the target device by seeking the correction value of the conversion scaling factor, and reduces the problem that the position acquisition is inaccurate due to the signal intensity errors.

Of course, implementing any product of the present application does not necessarily need to achieve all of the technical effects described above at the same time.

BRIEF DESCRIPTION OF THE DRAWINGS

The drawings illustrated herein are intended to provide further understanding of the present application, constituting a part of the present application. Exemplary embodiments and explanations of the present application here are only for explanation of the present application, and do not constitute an undue limitation to the present application. In the drawings.

DETAILED DESCRIPTION

Figure 1:
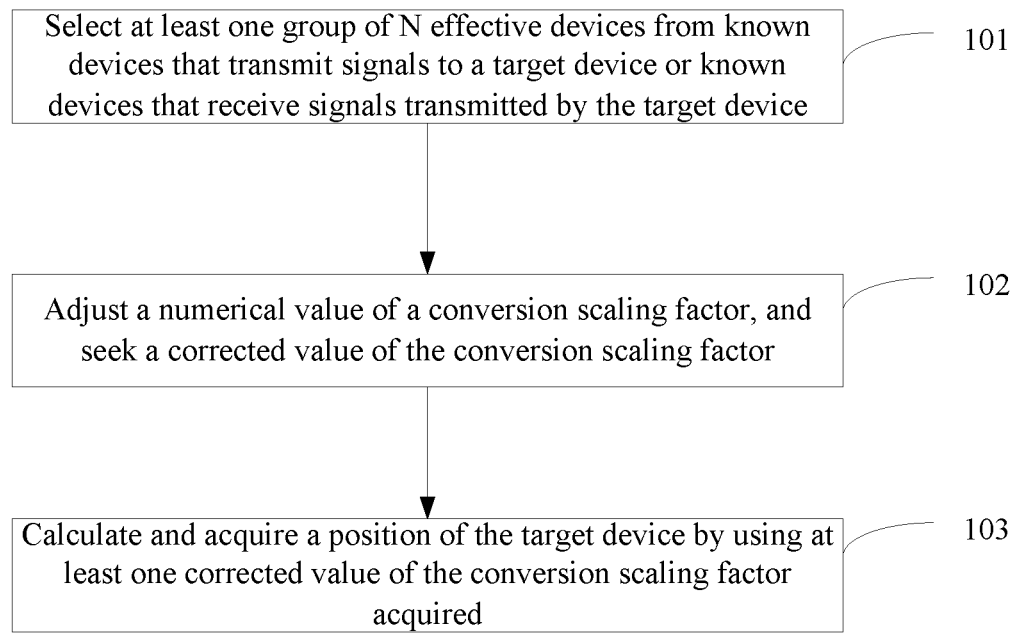
FIG. 1 is a flow chart of one embodiment of a position acquisition method of the embodiments of the present application.

The implementation manners of the present application will be explained in details with reference to the drawings and embodiments hereinafter, so that the realization process of how to solve the technical problems by using a technical means and achieve the technical efficacy can be sufficiently understood and implemented accordingly.

The technical solutions of the present application are mainly applicable to an indoor positioning scene, to acquire the position of the target device by using a position of a known device with a known position and a distance from a target device. Therefore, it is necessary to determine a device distance between the known device and the target device firstly.

Among indoor position technologies at current, the distance is mainly acquired by converting signal strength of a signal transmitted or received between the known device and the target device to distance through a conversion scaling factor. Therefore, signal communications between the known equipment and the target may be implemented by mainly using such technologies as Wifi, Bluetooth, infrared rays, ultra-wideband, RFID, ZigBee or ultrasonic technology, or the like.

In different application scenes such as supermarkets, emporiums and other application scenes, the target device may be positioned through deploying the known devices.

As described in the background, signal intensity errors may be caused by signal interference and design differences in antennas, circuits and housing of devices under different brands, which will lead to more solutions or no solutions of the target device calculated and acquired, so that the position of the target device cannot be acquired accurately.

In order to solve the technical problem of the prior art that the position of the target device cannot be acquired accurately, the inventors have made a series of studies to propose the technical solutions of the present application. In the embodiments of the present application, at least one group of N effective devices is selected from known devices that transmit signals to a target device or known devices that receive signals transmitted by the target device; a numerical value of a conversion scaling factor is adjusted with respect to each group of N effective devices, and a corrected value of the conversion scaling factor is sought, the corrected value enabling N circles or spheres formed by taking a position of each effective device as a center and a corrected distance between each effective device and the target device as a radius to have a unique intersection, wherein, the conversion scaling factor is used to convert a signal intensity of the signal transmitted by the effective device towards the target device or the received signal transmitted by the target device into a distance; and a position of the target device is calculated and acquired by using at least one corrected value of the conversion scaling factor acquired. In the embodiments of the present application, the unique position of the target device may be determined by adjusting the conversion scaling factor, so that the position acquisition accuracy of the target device is improved.

The technical solutions of the present application will be described in details hereinafter with reference to the drawings.

FIG. 1 is a flow chart of one embodiment of a position acquisition method provided by the embodiments of the present application. The method may include the several steps as follows.

In step 101: at least one group of N effective devices is selected from known devices that transmit signals to a target device or known devices that receive signals transmitted by the target device.

Wherein, the known devices refer to devices with known positions in a coordinate space, and the target device is a device with a position to be determined.

The known devices and the target device may refer to devices that transmit data by using Bluetooth, Wifi, RFID and other wireless transmission technologies.

The known devices may receive or transmit signals, and the target device may also receive or transmit signals. The devices that receive signals may upload the signals to a computing system, then the computing system selects N effective devices are selected from the known devices that transmit signals to the target device or the known devices that receive signals transmitted by the target device, and utilizes the signal intensity to position.

In step 102: a numerical value of a conversion scaling factor is adjusted, and a corrected value of the conversion scaling factor is sought.

The corrected value enables N circles or spheres formed by taking a position of each effective device as a center and a corrected distance between each effective device and the target device as a radius to have a unique intersection.

Wherein, the conversion scaling factor is used to convert a signal intensity of the signal transmitted by the effective device towards the target device or the received signal transmitted by the target device into a distance.

Wherein, a circle is formed in a one-dimensional or two-dimensional coordinate space, while a sphere is formed in a three-dimensional coordinate space or above.

The corrected distance is namely acquired by converting the corrected value of the conversion scaling factor, and the corrected value of the conversion scaling factor may be an initial value or any value after the adjustment.

Wherein, the conversion scaling factor refers to a parameter that converts signal intensity to distance, and a conversion formula is as described below:

$$d^2 = C^2(R_0 - R);$$

Wherein, R is a signal intensity of the signal received or transmitted, d represents distance, C is the conversion scaling factor, $R_0$ may be an international standard value, or a mean signal intensity when the known devices are infinitely close to main devices of different models for receiving signals and uploading the signals to the computing system.

In the application, the conversion scaling factor may specifically convert the signal intensity of the signal transmitted by the effective device towards the target device or the signal received by the target device into distance. In the prior art, the conversion scaling factor is usually an international standard value. While in the embodiment, the numerical value of the conversion scaling factor may be adjusted in order to solve the problem that the distance calculation is inaccurate due to the signal intensity errors, so as to affect the accurate positioning of the position of the target device position.

Wherein, the adjusting the numerical value of the conversion scaling factor and seeking the corrected value of the conversion scaling factor may be to enlarge or reduce the numerical value of the conversion scaling factor, so as to acquire the corrected value; certainly, the corrected value of the conversion scaling factor may also be acquired through a calculation method.

In step 103: a position of the target device is calculated and acquired by using at least one corrected value of the conversion scaling factor acquired.

Wherein, the method for calculating and acquiring the position of the target device by using the conversion scaling factor may be the same as that of the prior art, for example, a triangle and centroid algorithm, and will not be elaborated herein.

In the embodiment, the corrected value is acquired by adjusting the numerical value of the conversion scaling factor, wherein the corrected value enables the N circles or spheres formed by taking the corrected distance between N effective devices and the target device as the radius to have the unique intersection which is namely the position of the target device, so that the position of the target device can be acquired. In the embodiment of the present application, the corrected value is sought by adjusting the conversion scaling factor, so that the position acquisition accuracy of the target device is improved.

Wherein, multiple groups of N effective devices may be selected, so that a plurality of corrected values of the conversion scaling factor can be acquired, and the position of the target device may be calculated and acquired by using a mean value of the plurality of corrected values, so that the position acquisition is more accurate.

Certainly, the corrected value of each conversion scaling factor may also be used to calculate and acquire an initial position of the target device firstly; then the initial position is mean to acquire a final position of the target device, so that the position acquisition accuracy can also be improved.

Wherein, as another embodiment, the adjusting the numerical value of the conversion scaling factor, and seeking the corrected value of the conversion scaling factor, may be:

enlarging or reducing the numerical value of the conversion scaling factor from an initial value of the conversion scaling factor, and by taking a current adjusted value of the conversion scaling factor as the corrected value of the conversion scaling factor when the current adjusted value enables the N circles or spheres formed by taking the position of each effective device as the center and the corrected distance between each effective device and the target device as the radius to have the unique intersection.

At this moment, N is an integer greater than a dimension of a coordinate space.

That is, N may be equal to the dimension of the coordinate space plus 1.

Therefore, N may be an integer equal to 2 in a one-dimensional coordinate space, equal to 3 in a two-dimensional coordinate space, and equal to 4 in a three-dimensional coordinate space.

Wherein, N effective devices may refer to N effective devices not located in the same position in a one-dimensional space, not in the same straight line in a two-dimensional space, and not in the same plane in a three-dimensional space.

The current distance is namely acquired by converting the current adjusted value of the conversion scaling factor, and the current value of the conversion scaling factor may be an initial value or any value after the adjustment.

The initial value of the conversion scaling factor may either be an international standard value, or the mean conversion scaling factor calculated from a signal intensity tested and acquired when any two known devices are kept by 1 m by using the foregoing conversion formula.

The N circles or N spheres acquired by taking the position of each effective device as the center and the distance between each effective device and the target device as the radius have the unique intersection.

Therefore, in the embodiment, the numerical value of the conversion scaling factor may be adjusted so as to ensure that the N circles or N spheres corresponding to the N effective devices have one unique intersection, so as to reduce the problem of inaccurate position acquisition caused by the signal intensity error to a certain extent.

The corrected value of the conversion scaling factor can be acquired by adjusting the numerical value of the conversion scaling factor, and the N circles or N spheres corresponding to the N effective devices are enabled to have the unique intersection through the corrected distance calculated and acquired.

As another embodiment, the enlarging or reducing the numerical value of the conversion scaling factor from an initial value of the conversion scaling factor, and taking a current adjusted value of the conversion scaling factor as the corrected value of the conversion scaling factor when the current adjusted value enables the N circles or spheres formed by taking the position of each effective device as the center and the corrected distance between each effective device and the target device as the radius to have the unique intersection, may include the following several steps.

(X1) Any effective device is selected from the N effective devices as a judgment device, and other N−1 effective devices are taken as positioning devices.

(X2) N−1 circles or spheres formed by taking a current distance between the N−1 effective devices and the target device as a radius are judged whether to have an intersection and whether a current distance between the judgment device and the target device is equal to an intersection distance between the judgment device and an intersection position from by taking the initial value of the conversion scaling factor as the current adjusted value.

Wherein, the current distance is namely calculated and acquired by using a current adjusted value of the conversion scaling factor.

(X3) If the judgment result of (X2) is yes, then the current value of the conversion scaling factor is taken as the corrected value of the conversion scaling factor.

That is, if the N−1 circles or spheres have intersection, and the current distance between the judgment device and the target device is equal to an intersection distance between the judgment device and any intersection position, then it represents that the N circles formed by taking the current distances between the positioning devices and the target device as well as the current distance between the judgment device and the target device as the radius respectively have the unique intersection, and the current value at this moment is namely taken as the corrected value.

(X4) If the judgment result of (X2) is no, i.e., the N−1 circles or spheres have no intersection, or the current distance between the judgment device and the target device cannot be equal to the intersection distance between the judgment device and any intersection position, following operations are performed.

(X41) The current distance between the judgment device and the target device is compared with a first intersection distance between the judgment device and an intersection position close to the judgment device, a second intersection distance between the judgment device and an intersection position far from the judgment device, and a center distance between the judgment device and a central point of a connecting line of the two intersection positions respectively when the N−1 circles or spheres have two intersection positions.

(X411) If the current distance is less than the first intersection distance and less than the center distance, or the current distance is less than the second intersection distance and greater than the center distance, the conversion scaling factor is enlarged.

(X412) If the current distance is greater than the first intersection distance and less than the center distance, or the current distance is greater than the second intersection distance and greater than the center distance, or the current distance is greater than the first intersection distance and equal to the center distance, and a current distance between the judgment device and the target device is equal to current distances between the positioning devices and the target device respectively, the conversion scaling factor is reduced.

(X413) If the current distance is equal to the center distance, and the current distance between the judgment device and the target device is unequal to the current distances between the positioning devices and the target device respectively, one effective device is selected as a judgment device and the other N−1 effective devices are taken as positioning devices to perform continuously.

(X42) When the N−1 circles or spheres have no intersections and are externally separated from each other, and the N−1 circles or spheres are externally separated from a circle or sphere formed by taking the current distance between the judgment device and the target device as a radius respectively, and current distances between the N effective devices and the target device are equal, the conversion scaling factor is enlarged.

That is, the conversion scaling factor is enlarged when the N circles formed by taking the current distances between the positioning devices and the target device as well as the current distance between the judgment device and the target device as the radius respectively are externally separated, and the current distances between the positioning devices and the target device as well as the current distance between the judgment device and the target device are respectively equal.

After enlarging or reducing the conversion scaling factor in each time, the adjusted value that is enlarged or reduced is taken as the current value namely, and then it returns to step (X2) to perform continuously until the N−1 circles or spheres formed by taking the current distance between the N−1 effective devices and the target device as the radius have intersection, and the current distance between the judgment device and the target device is equal to the intersection distance between the judgment device and any intersection position; at this moment, the current value is namely the corrected value.

The adjustment of the conversion scaling factor will be further introduced hereinafter in details with reference to the one-dimensional coordinate space, the two-dimensional coordinate space and the three-dimensional coordinate space respectively.

In the one-dimensional coordinate space:

a position coordinate of the N effective devices is a one-dimensional coordinate, N is equal to 2, and the N effective devices include two effective devices.

The adjusting the conversion scaling factor from the initial value of the conversion scaling factor, and acquiring the corrected value of the conversion scaling factor, to enable N circles or spheres formed by taking the position of each effective device as the center and the current distance between each effective device and the target device as the radius to have the unique intersection, may include the following steps.

(A1) One effective device is selected from the N effective devices as a positioning device and the other is taken as a judgment device.

(A2) In the one-dimensional coordinate space, only one positioning device is included, and only one circle is formed by taking the current distance between the positioning device and the target device as the radius. To facilitate description, the circle is named as a positioning circle.

At this moment, two intersection positions formed by a connecting line of the judgment device and the positioning device with the positioning circle are namely taken as the intersection position of the N−1 circles.

Then in step (A2), whether the current distance between the judgment device and the target device is equal to the intersection distance between the judgment device and any intersection position is judged.

(A3) If the result of step (A2) is yes, then the current value is taken as the corrected value.

(A4) If the result of step (A3) is no, the current distance between the judgment device and the target device is compared with a first intersection distance between the judgment device and an intersection position close to the judgment device, a second intersection distance between the judgment device and an intersection position far from the judgment device, and a center distance between the judgment device and a central point of a connecting line of the two intersection positions respectively.

As shown in FIGS. 2a to 2e, two circles are formed by the positioning device A and the judgment device B, the two intersection positions of the positioning device are respectively a and b, the intersection position a is the intersection position close to the judgment device, and the intersection position b is the intersection position far from the judgment device.

Figure 2A:
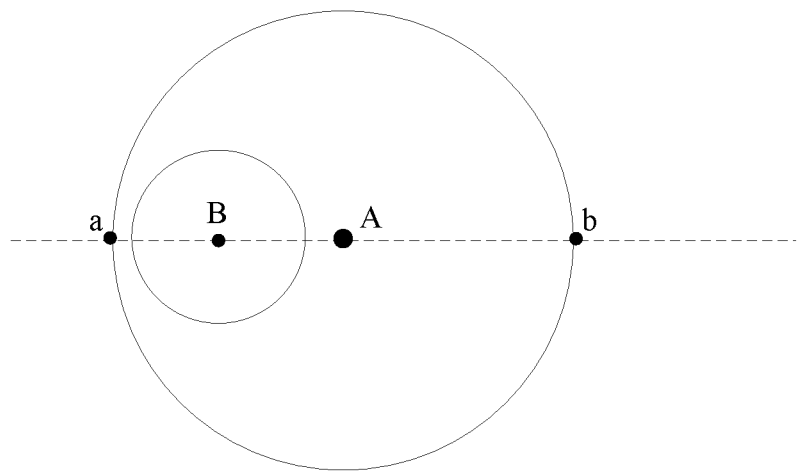
FIGS. 2a to 2k are schematic diagrams for position acquisition in a one-dimensional coordinate space of the embodiments of the present application.
Figure 2B:
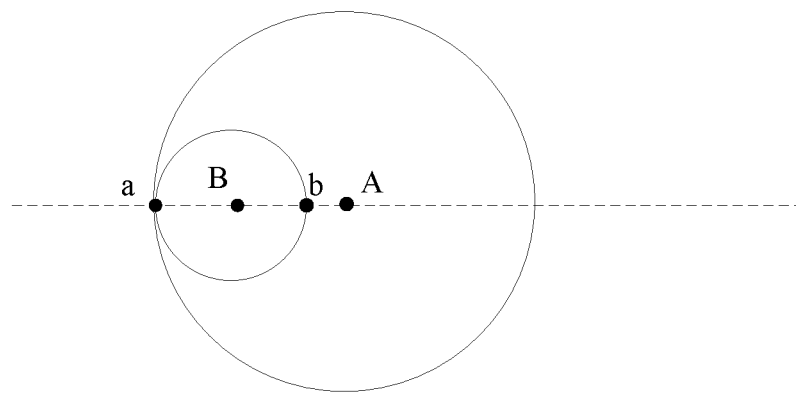

(A41) If the current distance is less than the first intersection distance and less than the center distance, the conversion scaling factor is enlarged, as shown in FIG. 2a; the current distance is enabled to be equal to the first intersection distance and intersected at the intersection position a by enlarging the conversion scaling factor, as shown in FIG. 2b.

Figure 2C:
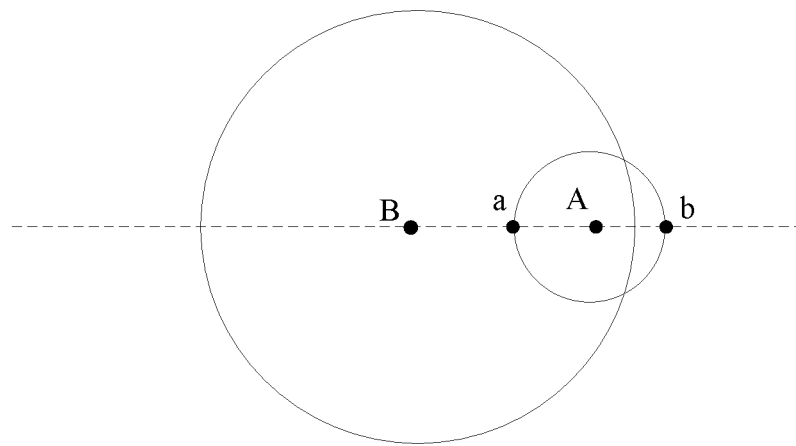
Figure 2D:
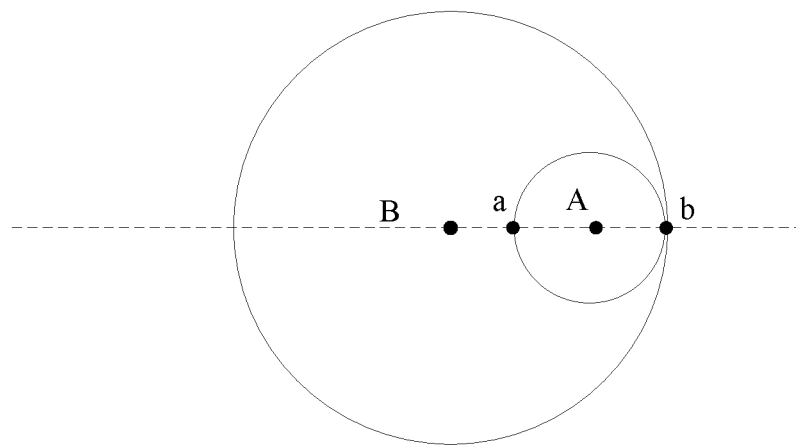

(A42) If the current distance is less than the second intersection distance and greater than the center distance, the conversion scaling factor is enlarged, as shown in FIG. 2c. The current distance is enabled to be equal to the first intersection distance and intersected at the intersection position b by enlarging the conversion scaling factor, as shown in FIG. 2d.

Figure 2E:
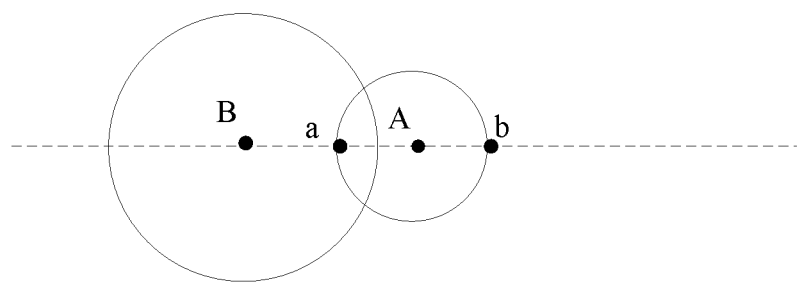
Figure 2F:
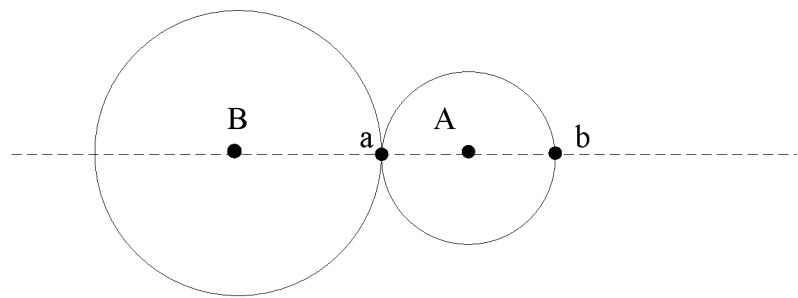

(A43) If the current distance is greater than the first intersection distance and less than the center distance, the conversion scaling factor is reduced, as shown in FIG. 2e. The current distance is enabled to be equal to the first intersection distance and intersected at the intersection position a by reducing the conversion scaling factor, as shown in FIG. 2f.

Figure 2G:
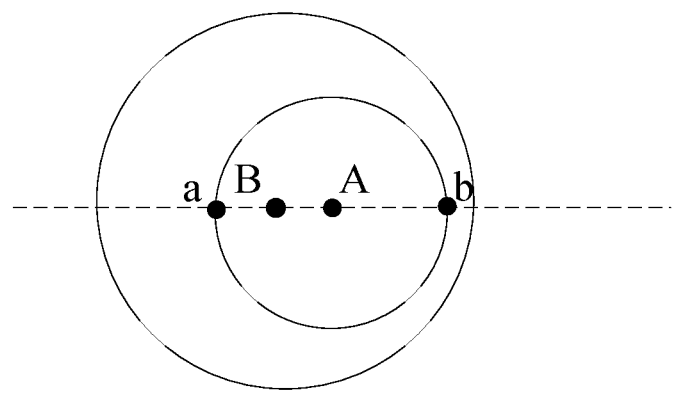
Figure 2H:
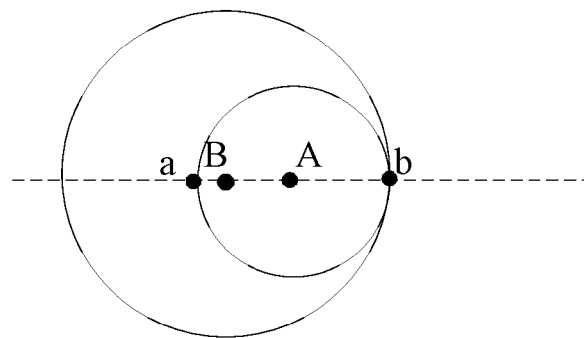

(A44) If the current distance is greater than the second intersection distance and greater than the center distance, the conversion scaling factor is reduced, as shown in FIG. 2g. The current distance is enabled to be equal to the second intersection distance and intersected at the intersection position b by reducing the conversion scaling factor, as shown in FIG. 2h.

Figure 2I:
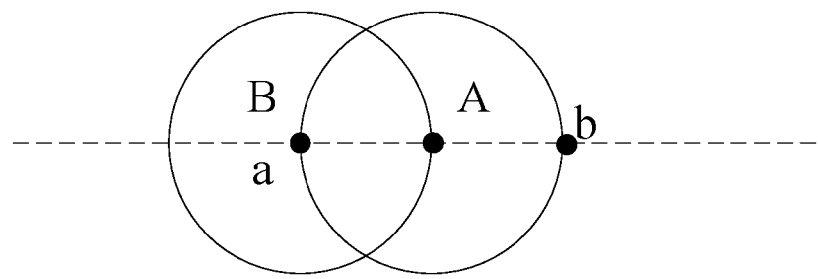
Figure 2J:
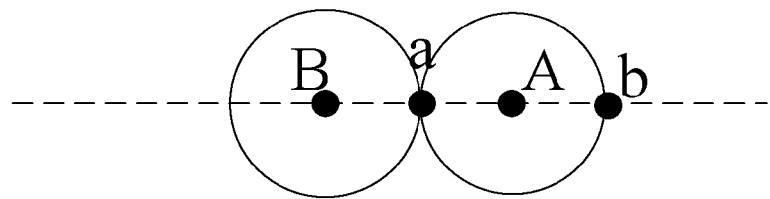

(A45) If the current distance is greater than the first intersection distance and equal to the center distance, and a current distance between the judgment device and the target device is equal to a current distance between the positioning device and the target device respectively, the conversion scaling factor is reduced, as shown in FIG. 2i; the current distance is enabled to be equal to the first intersection distance and intersected at the intersection position a by reducing the conversion scaling factor, as shown in FIG. 2j.

Figure 2K:
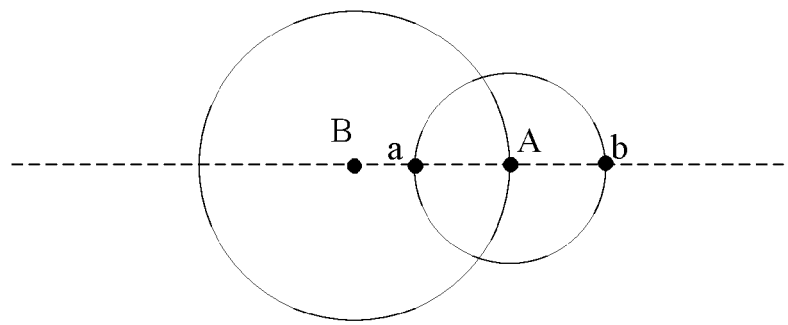

(A46) If the current distance is equal to the center distance, and the current distance between the judgment device and the target device is unequal to the current distance between the positioning device and the target device respectively, return to step (A1) to reselect one effective device as a judgment device and use the other effective devices as a positioning device to perform continuously; that is, roles of the positioning device and the judgment device are exchanged, as shown in FIG. 2k.

In the two-dimensional coordinate space:

a position coordinate of the N effective devices is a two-dimensional coordinate, and the N effective devices include three effective devices.

The adjusting the conversion scaling factor from the initial value of the conversion scaling factor, and acquiring the corrected value of the conversion scaling factor, to enable N circles or spheres formed by taking the position of each effective device as the center and the corrected distance between each effective device and the target device as the radius to have the unique intersection, may include the following steps.

(B1) Any two effective devices are selected from the N effective devices as positioning devices and the other is taken as a judgment device.

(B2) Two circles formed by taking current distances between the positioning devices and the target device as a radius are judged whether to have an intersection and whether a current distance between the judgment device and the target device is equal to an intersection distance between the judgment device and an intersection position from by taking the initial value of the conversion scaling factor as the current adjusted value.

Wherein, the current distance is calculated and acquired by using a current value of the conversion scaling factor.

(B3) If the judgment result of (B2) is yes, i.e., the two circles formed by the positioning devices have intersection, and the current distance between the judgment device and the target device is equal to the intersection distance between the judgment device and any intersection position, the current value of the conversion scaling factor is taken as the corrected value of the conversion scaling factor at this moment.

(B4) If the judgment result of (B2) is no, then following operations are performed.

(B41) The current distance between the judgment device and the target device is compared with a first intersection distance between the judgment device and an intersection position close to the judgment device, a second intersection distance between the judgment device and an intersection position far from the judgment device, and a center distance between the judgment device and a central point of a connecting line of the two intersection positions respectively when the two circles have two intersection positions.

As described in FIGS. 3a to 3j, the two circles formed by the two positioning devices have two intersection positions which are c and d respectively, wherein the intersection position c is an intersection position close to the judgment device C, and the distance from the judgment device C to the intersection position c is the first intersection distance; therefore, the distance from the judgment device C to the intersection position d is namely the second intersection distance, and the distance from the judgment device C to the central point in of the connecting line of c and d is the center distance.

Figure 3A:
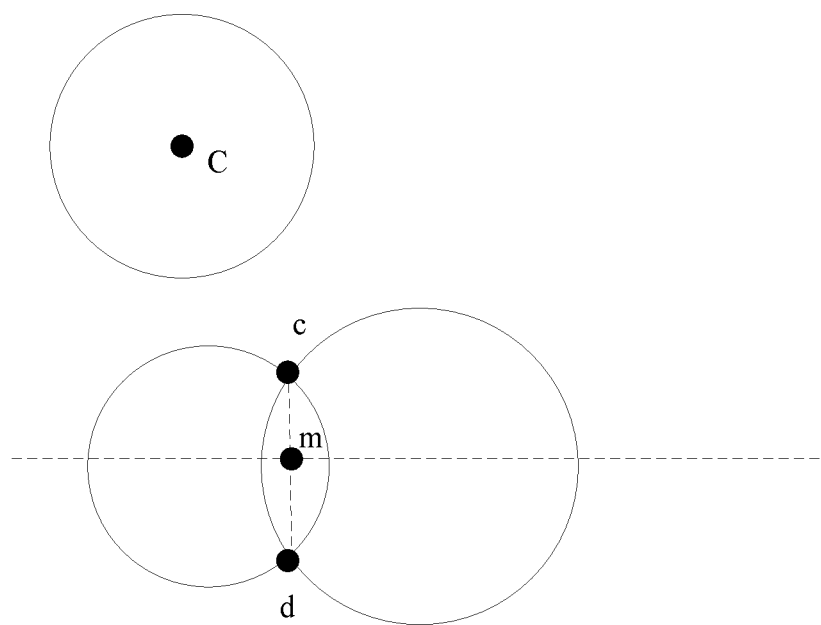
FIGS. 3a to 3m are schematic diagrams for position acquisition in a two-dimensional coordinate space of the embodiments of the present application.
Figure 3B:
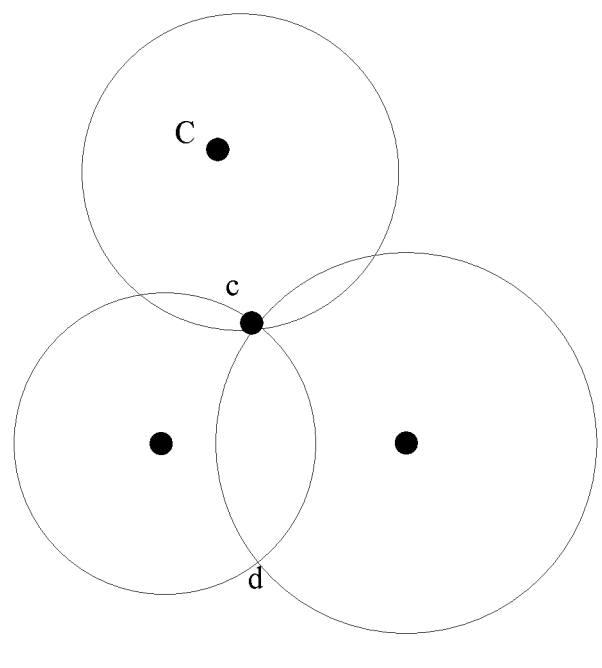

(B411) If the current distance is less than the first intersection distance and less than the center distance, the conversion scaling factor is enlarged. As is shown in FIG. 3a. The current distance is enabled to be equal to the first intersection distance and the three circles are intersected at the intersection position c by enlarging the conversion scaling factor, as shown in FIG. 3b.

Figure 3C:
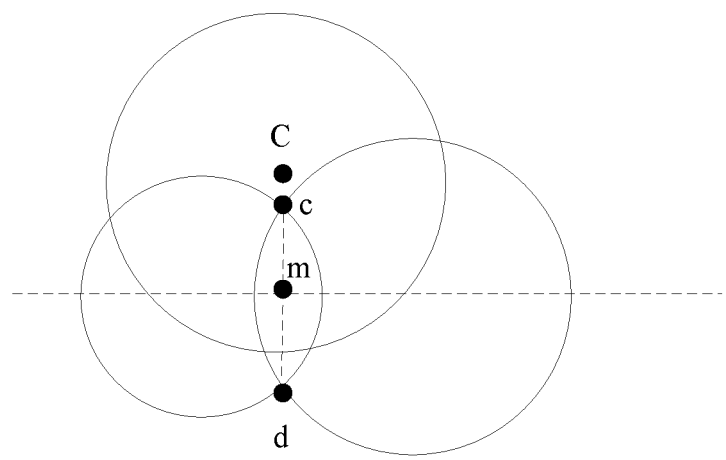
Figure 3D:
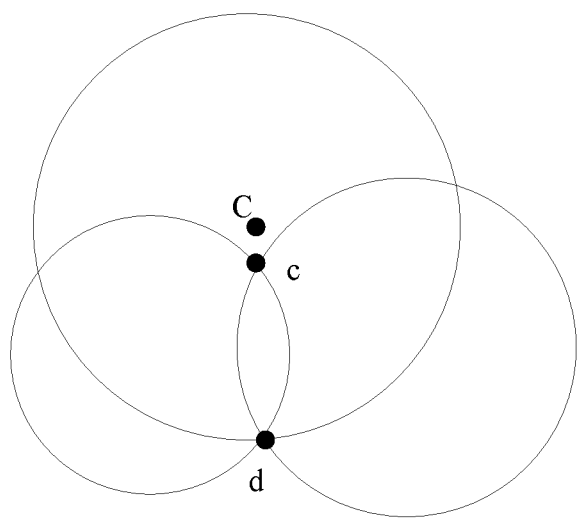

(B412) If the current distance is less than the second intersection distance and greater than the center distance, the conversion scaling factor is enlarged, as shown in FIG. 3c; the current distance is enabled to be equal to the second intersection distance and the three circles are intersected at the intersection position b by enlarging the conversion scaling factor, as shown in FIG. 3d.

Figure 3E:
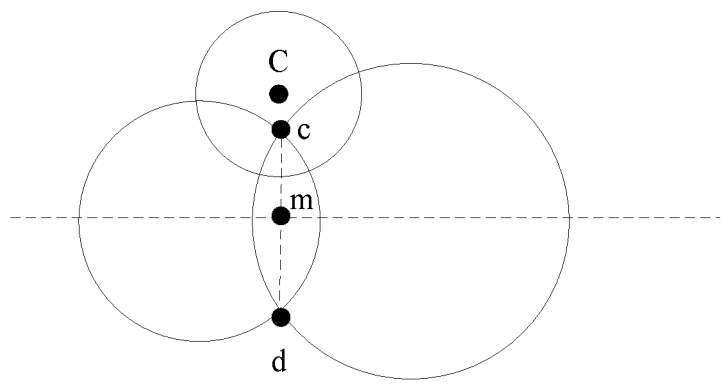
Figure 3F:
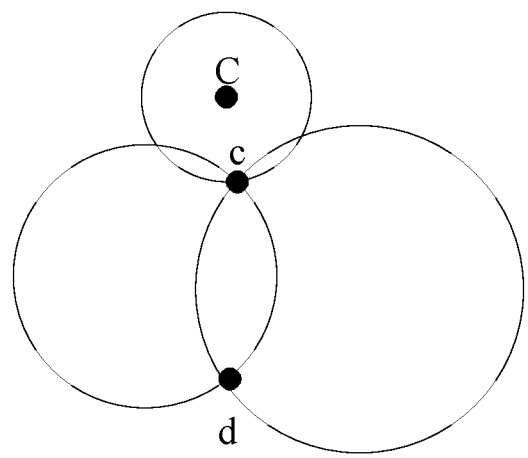

(B413) If the current distance is greater than the first intersection distance and less than the center distance, the conversion scaling factor is reduced, as shown in FIG. 3e; the current distance is enabled to be equal to the first intersection distance and the three circles are intersected at the intersection position c by reducing the conversion scaling factor, as shown in FIG. 3f.

Figure 3G:
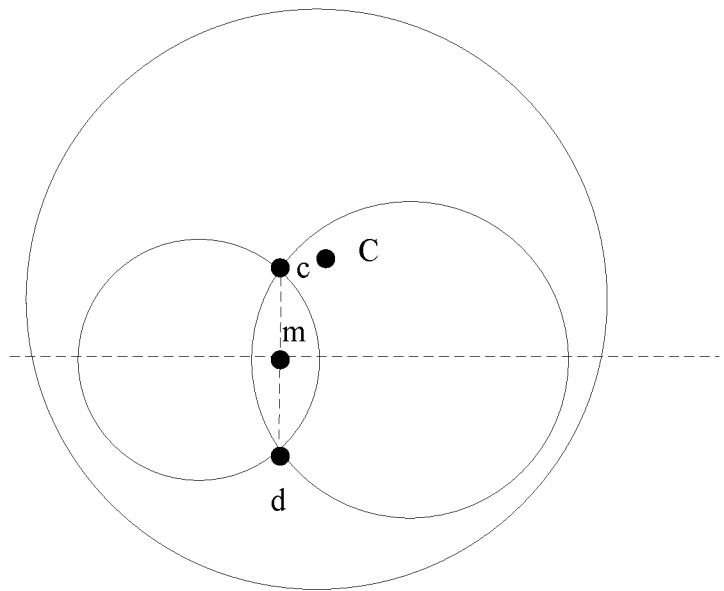
Figure 3H:
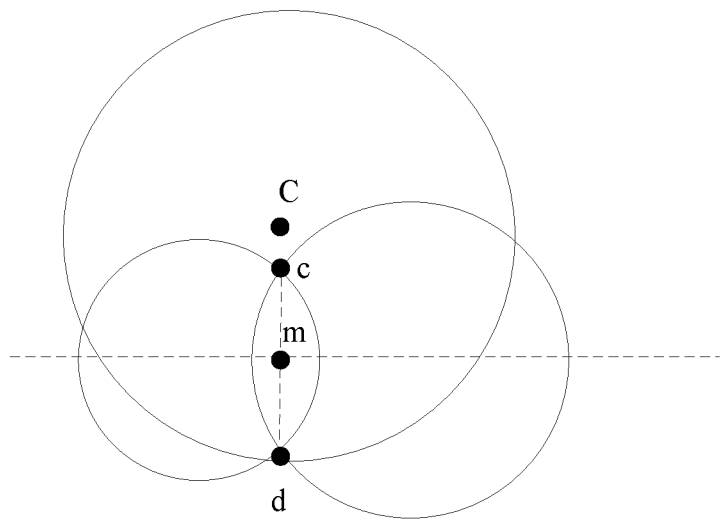

(B414) If the current distance is greater than the second intersection distance and greater than the center distance, the conversion scaling factor is reduced, as shown in FIG. 3g; the current distance is enabled to be equal to the second intersection distance and the three circles are intersected at the intersection position d by reducing the conversion scaling factor, as shown in FIG. 3h.

Figure 3I:
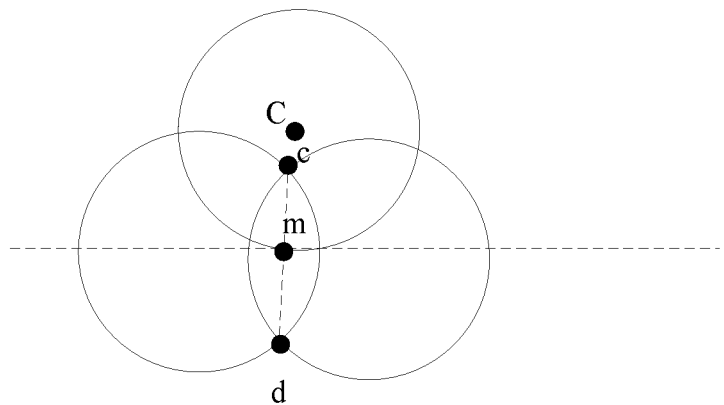

(B415) If the current distance is greater than the first intersection distance and equal to the center distance, and a current distance between the judgment device and the target device is equal to a current distance between the positioning device and the target device respectively, the conversion scaling factor is reduced, as shown in FIG. 3i; the current distance is enabled to be equal to the first intersection distance and the three circles are intersected at the intersection position c by enlarging the conversion scaling factor.

Figure 3J:
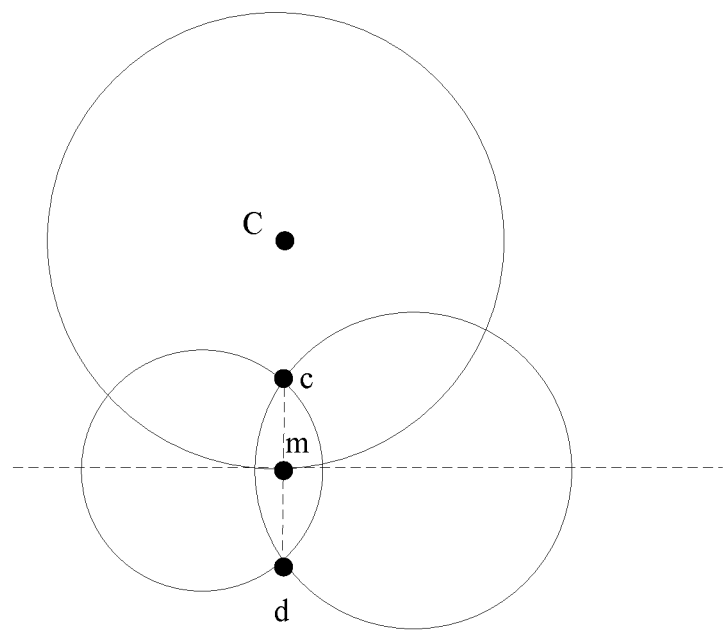

(B416) If the current distance is equal to the center distance, and the current distance between the judgment device and the target device is unequal to the current distances between the positioning devices and the target device respectively, one effective device is reselected as a judgment device and the other two effective devices are taken as positioning devices to perform continuously, as shown in FIG. 3j.

(B42) When the two circles have no intersections and the two circles are externally separated from the circle or sphere formed by taking the current distance between the judgment device and the target device as the radius, and current distances between the three effective devices and the target device are equal, the conversion scaling factor is enlarged.

Figure 3K:
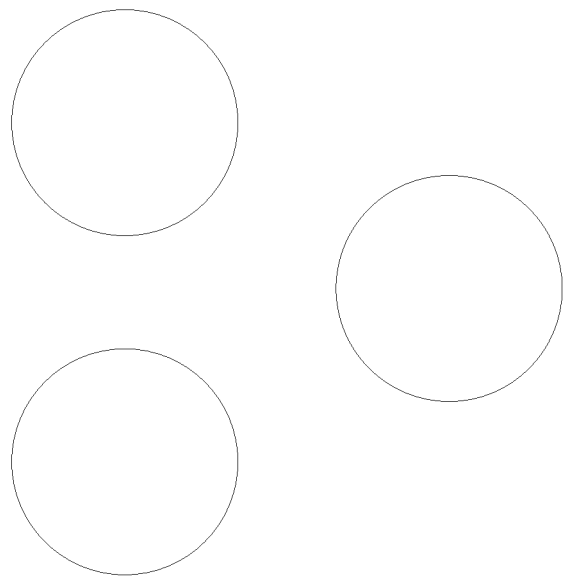

As shown in FIG. 3k, the circles formed by the three effective devices A, B and C are externally separated from each other, and the current distances between the three effective devices and the target device are equal, then the conversion scaling factor is enlarged at this moment.

Moreover, in the two-dimensional coordinate space, when the N−1 circles formed by the positioning devices have one intersection position and are externally tangent, the method further includes the following steps.

Figure 3L:
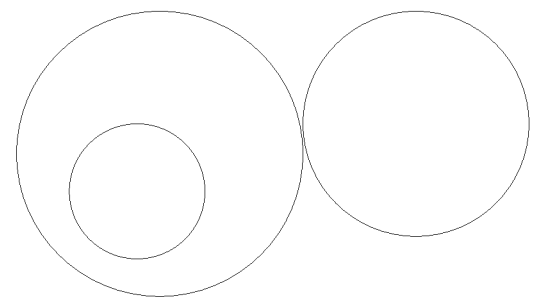

If the circle formed by taking the current distance between the judgment device and the target device as the radius is externally separated from any one of the N−1 circles, one group of N effective devices is reselected to perform continuously, as shown in FIG. 3l.

If the circle formed by taking the current distance between the judgment device and the target device as the radius is internally tangent to any one of the N−1 circles, and the internally tangent point is not an intersection position, one group of N effective devices is reselected to perform continuously.

Figure 3M:
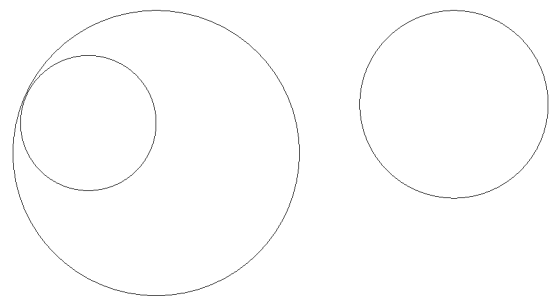

When the N−1 circles formed by the positioning devices have one intersection position and are internally tangent, if the circle formed by taking the current distance between the judgment device and the target device as the radius is externally separated from all the N−1 circles, one group of N effective devices is reselected to perform continuously, as shown in FIG. 3m.

In the three-dimensional coordinate space:

a position coordinate of the N effective devices is a three-dimensional coordinate, and the N effective devices include four effective devices.

The adjusting the conversion scaling factor, and acquiring the corrected value of the conversion scaling factor, to enable N circles or spheres formed by taking the position of each effective device as the center and the current distance between each effective device and the target device as the radius to have the unique intersection, may include the following steps.

(C1) Any three effective devices are selected from the N effective devices as positioning devices and the other is taken as a judgment device.

(C2) Three spheres formed by taking current distances between the positioning devices and the target device as a radius are judged whether to have an intersection and whether a current distance between the judgment device and the target device is equal to an intersection distance between the judgment device and an intersection position from by taking the initial value of the conversion scaling factor as the current adjusted value.

Wherein, the current distance is calculated and acquired by using a current value of the conversion scaling factor.

Figure 4A:
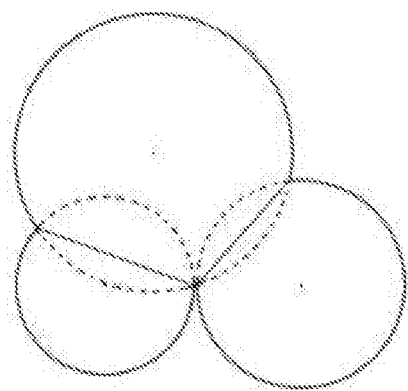
FIGS. 4a to 4c are schematic diagrams for position acquisition in a three-dimensional coordinate space of the embodiments of the present application.
Figure 4B:
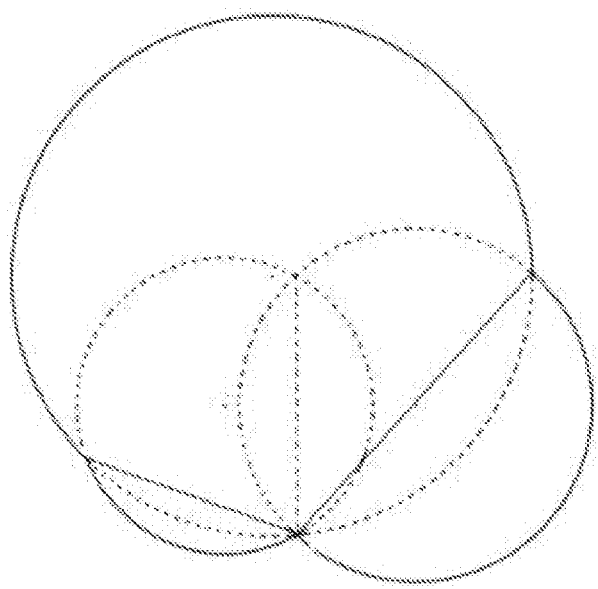
Figure 4C:
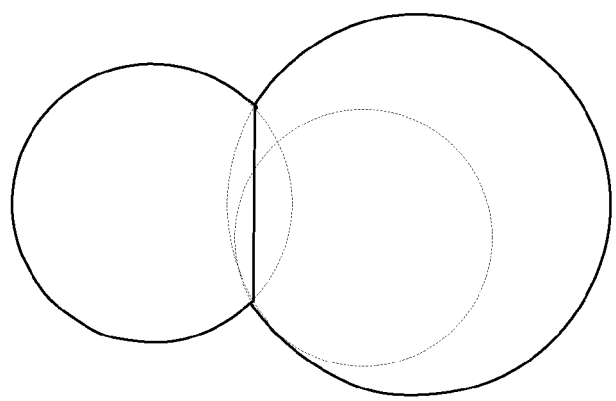

Wherein, the three spheres in the three-dimensional coordinate space have intersections, wherein three spheres are externally tangent, as shown in FIG. 4a; three spheres are intersected, as shown in FIG. 4b; and three spheres are internally tangent, as shown in FIG. 4c.

When three spheres are externally tangent or internally tangent, the three spheres have one intersection.

When three spheres are intersected, the three spheres have two intersections.

(C3) If all the judgment results of (C2) are yes, i.e., the three spheres formed by the positioning devices have intersection, and the current distance between the judgment device and the target device is equal to the intersection distance between the judgment device and any intersection position, the current value of the conversion scaling factor is taken as the corrected value of the conversion scaling factor at this moment.

(C4) If the judgment result of (C2) is no, then following operations are performed.

(C41) The current distance between the judgment device and the target device is compared with a first intersection distance between the judgment device and an intersection position close to the judgment device, a second intersection distance between the judgment device and an intersection position far from the judgment device, and a center distance between the judgment device and a central point of a connecting line of the two intersection positions respectively when the N−1 circles or spheres have two intersection positions.

Wherein, in the three-dimensional coordinate space, the center distance between the judgment device and the central point of the connecting line of the two intersection positions specifically refer to a center distance of a plane formed from the judgment device and the central point of the connecting line of the two intersection positions.

(C411) If the current distance is less than the first intersection distance and less than the center distance, the conversion scaling factor is enlarged.

(C412) If the current distance is less than the second intersection distance and greater than the center distance, the conversion scaling factor is enlarged.

(C413) If the current distance is greater than the first intersection distance and less than the center distance, the conversion scaling factor is reduced.

(C414) If the current distance is greater than the second intersection distance and greater than the center distance, the conversion scaling factor is reduced.

(C415) If the current distance is greater than the first intersection distance and equal to the center distance, and a current distance between the judgment device and the target device is equal to a current distance between the positioning device and the target device respectively, the conversion scaling factor is reduced.

(C416) If the current distance is equal to the center distance, and the current distance between the judgment device and the target device is unequal to the current distances between the positioning devices and the target device respectively, one effective device is reselected as a judgment device and the other three effective devices are taken as positioning devices to perform continuously.

(C42) When the three spheres have no intersections and are externally separated from each other, and the three spheres are externally separated from a circle or sphere formed by taking the current distance between the judgment device and the target device as a radius respectively, and current distances between the four effective devices and the target device are equal, the conversion scaling factor is enlarged.

Moreover, in the three-dimensional coordinate space, when the N−1 circles have one intersection position and are externally tangent, the method further includes the following steps.

When the position coordinates of the N effective devices is a three-dimensional coordinate, N is equal to 4, the N−1 spheres have no intersection, and any two spheres are internally contained, then one group of N effective devices is reselected to perform continuously.

Wherein, as another embodiment, in a one-dimensional coordinate space, when a position coordinate of the N effective devices is a one-dimensional coordinate, N is equal to 2; and the adjusting the numerical value of the conversion scaling factor, and seeking the corrected value of the conversion scaling factor, may be:

selecting one from the two effective devices as a positioning device and the other as a judgment device;

when a device distance between the positioning device and the judgment device is less than an initial distance between the judgment device and the target device, then the corrected value of the conversion scaling factor may be acquired according to a following calculation formula:

$$d_1-d_2=L;$$

$$d_1^2=C_{cal}^2(R_0-R_1);$$

$$d_2^2=C_{cal}^2(R_0-R_2);$$

wherein, L is a distance between the positioning device and the judgment device, $R_1$ is a corresponding signal intensity of the judgment device, and $R_2$ is a corresponding signal intensity of the positioning device; $C_{cal}$ is the corrected value of the conversion scaling factor, $d_1$ is a corrected distance between the judgment device and the target device, and $d_2$ is a corrected distance between the positioning device and the target device.

Therefore, the corrected value of the conversion scaling factor is calculated and acquired as follows:

$$C_{cal} = \frac{L}{\sqrt{R_0-R_1}-\sqrt{R_0-R_2}};$$

it should be illustrated that a square root of the foregoing formula needs to be a positive value.

When the device distance between the positioning device and the judgment device is greater than the initial distance between the judgment device and the target device, the corrected value of the conversion scaling factor is calculated and acquired according to a following calculation formula:

$$d_1-d_2=L;$$

$$d_1^2=C_{cal}^2(R_0-R_1);$$

$$d_2^2=C_{cal}^2(R_0-R_2).$$

Therefore, the corrected value of the conversion scaling factor is calculated and acquired as follows:

$$C_{cal} = \frac{L}{\sqrt{R_0-R_1}+\sqrt{R_0-R_2}};$$

it should be illustrated that a square root of the foregoing formula needs to be a positive value.

During practical applications, for example, in a supermarket or a warehouse or other large scale places, the known devices in the embodiments of the present application may be known devices preset indoors with known positions.

The known devices may be disposed according to a preset array, and a plurality of known devices are respectively disposed at two opposite sides of each mobile region of the target device. The mobile region is an indoor activity range of the target device. The indoor environment may include a plurality of mobile regions which may be, for example, a passageway among shelves in the supermarket or warehouse, and the known devices may be disposed on the shelves at the two sides of the passageway.

Figure 5:
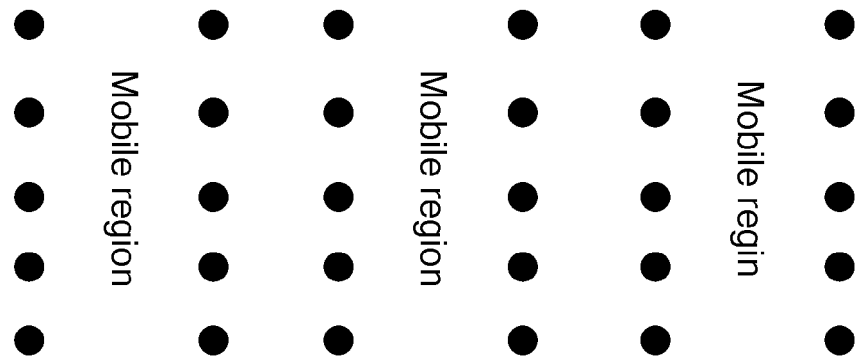
FIG. 5 is a schematic diagram of disposing known devices in an indoor environment in the embodiments of the present application.

FIG. 5 is a schematic diagram of disposing the known devices, wherein a plurality of known devices are respectively disposed at the two opposite sides of the mobile region.

In the practical application, an effective region range of the known devices for receiving or transmitting signals is a semicircle or semisphere, and the effective region range of the known devices is within the mobile region, i.e., signals received or transmitted outside the effective region range will be shielded automatically.

At this moment, as another embodiment:

the selecting at least one group of N effective devices from known devices that transmit signals to the target device or known devices that receive signals transmitted by the target device may include:

selecting four effective devices having unequal signal intensities located at two opposite sides with two effective devices comprised at each side according to a signal intensity sequence from strong to weak from the known devices that transmit signals to the target device or the known devices that receive signals transmitted by the target device, wherein only coordinate values corresponding to one coordinate axes in position coordinates of the two effective devices located at the same side are unequal.

Wherein, the effective region range of the known devices for receiving or transmitting signals is a semicircle or semisphere.

The effective device has a strongest signal intensity represents to be closest to the target device. Because the target device is under a mobile state, if a signal of a second time is detected to be relatively weakened than a signal of a first time, then the signal corresponding to the first time may be determined to be the strongest signal, wherein the first time and the second time are continuous time. Therefore, the effective devices may be selected according to the corresponding signal intensity of each known device in the first time.

Figure 6:
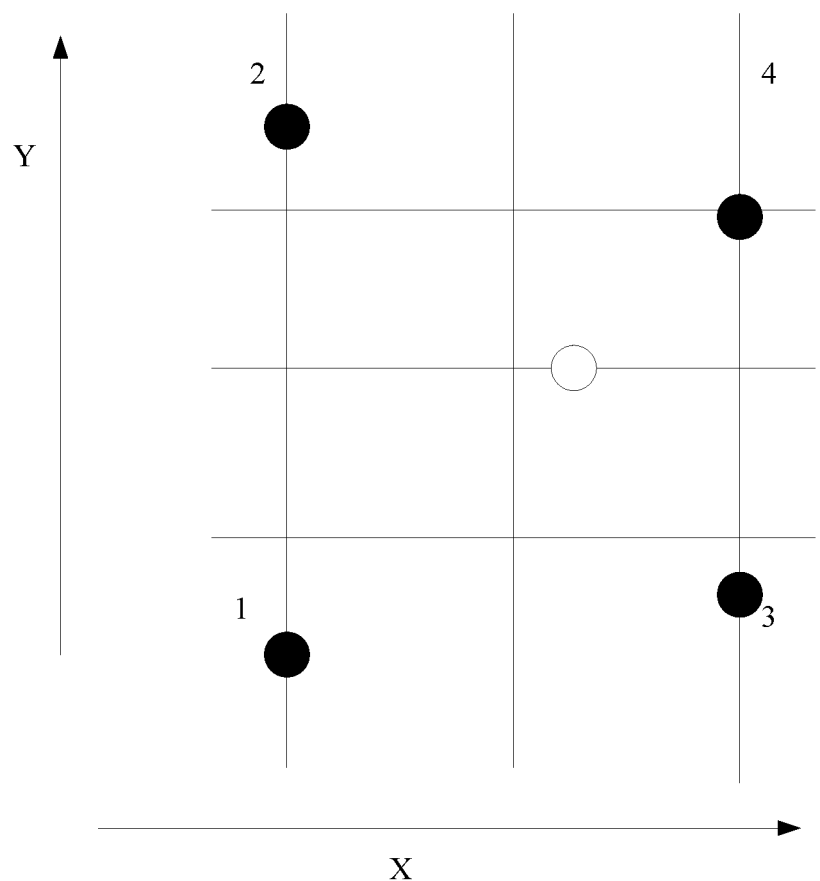
FIG. 6 is a schematic diagram of selecting effective devices in the embodiments of the present application.

As shown in FIG. 6, a while circle represents the target device, while black circles represent the effective devices namely. According to the known devices disposed as shown in FIG. 5, the four effective devices in FIG. 6 may be selected and acquired. Only coordinate values of one coordinate axes in the position coordinates of the two effective devices located at the same side (i.e., located at the same straight line) are unequal, i.e.

The adjusting the numerical value of the conversion scaling factor with respect to each group of four effective devices, and seeking the corrected value of the conversion scaling factor, includes:

determining that the target device is within a region range formed by connecting the four effective devices with respect to each group of four effective devices; and calculating and acquiring a corrected conversion factor of the target device according to a following calculation formula:

$$d_j^2=(X_{tm}-X_{jm})^2;$$

$$d_j^2=C_{cal}^2(R_0-R_j);$$

Wherein, a position coordinate of a $j^{th}$ effective device is $(X_{j1}, X_{j2}, \ldots, X_{jM})$, M is a dimension of a coordinate space, and M=1, 2, 3 . . . .

A position coordinate of the target device is $(X_{t1}, X_{t2}, \ldots, X_{tM})$.

Wherein, j=1, 2, 3 and 4, $X_{jm}$ is an m-dimensional coordinate of the $j^{th}$ effective device, and $X_{tm}$ is an m-dimensional coordinate of the target device; and $d_j$ is a corrected distance between the $j^{th}$ effective device and the target device, wherein, only m-dimensional coordinates of the four effective devices are unequal.

Two formulas for solving $X_{jm}$ including $C_{cal}$ may be acquired through the foregoing calculation formula. Set the two formulas be equal, then $C_{cal}$ may be calculated and acquired.

The $C_{cal}$ calculated and acquired may be substituted into any formula for $X_{jm}$, thus acquiring $X_{jm}$. Substituting $X_{jm}$ into a Euclidean distance formula can solve and acquire a coordinate value of other dimensions.

In order to improve the position acquisition exactitude, more groups of four effective devices may be selected, for example, five groups, i.e., 20 effective devices may be selected, so that corrected values of five conversion scaling factors may be calculated and acquired, and the coordinate value of each dimensional coordinate of the target device may be solved and acquired by using a mean value of the five corrected values to constitute the position coordinate of the target device and taken as the final position of the target device.

Moreover, each corrected value may also be used to solve the coordinate value of each dimensional coordinate of the target device, and acquire a plurality of coordinate values corresponding to each dimensional coordinate; then the mean coordinate value of a plurality of coordinate values corresponding to each dimensional coordinate is solved, and the position coordinate of the target device is constituted by the mean coordinate value of each dimensional coordinate and taken as the final position of the target device.

It is explained hereinafter by taking a two-dimensional coordinate space as an example. In a group of effective devices, the position coordinate of the effective device may be represented as $(X_j, Y_j)$, and the position coordinate of the target device is $(X_t, Y_t)$. It is provided that X coordinates of two effective devices located at the same side are equal, as shown in FIG. 6, i.e., $X_1=X_2$, and $X_3=X_4$;

according to a Euclidean distance formula:

$(X_t-X_1)^2+(Y_t-Y_1)^2=d_1^2$;

$(X_t-X_2)^2+(Y_t-Y_2)^2=d_2^2$;

$(X_t-X_3)^2+(Y_t-Y_3)^2=d_3^2$;

$(X_t-X_4)^2+(Y_t-Y_4)^2=d_4^2$;

because $X_1=X_2$, and $X_3=X_4$, the Euclidean distance formula may be simplified as:

$(Y_t-Y_1)^2=d_1^2$;

$(Y_t-Y_2)^2=d_2^2$;

$(Y_t-Y_3)^2=d_3^2$;

$(Y_t-Y_4)^2=d_4^2$;

with reference to a distance conversion formula:

$d_j^2=C_{cal}^2(R_0-R_j)$;

therefore, it may be calculated and acquired as follows:

$$Y_t = \frac{C_{cal}^2(R_2 - R_1) + Y_2^2 - Y_1^2}{2(Y_2 - Y_1)};$$

$$Y_t = \frac{C_{cal}^2(R_4 - R_3) + Y_4^2 - Y_3^2}{2(Y_4 - Y_3)};$$

let the two formulas be equal to each other, then the corrected value of the conversion scaling factor may be calculated and acquired as follows:

$$C_{cal}^2 = \frac{(Y_4^2 - Y_3^2)(Y_2 - Y_1) - (Y_2^2 - Y_1^2)(Y_4 - Y_3)}{(R_2 - R_1)(Y_4 - Y_3) - (R_4 - R_3)(Y_2 - Y_1)}.$$

After the corrected value of the conversion scaling factor is calculated and acquired, the position of the target device may be calculated and acquired according to the formula of the prior art.

Certainly, as another embodiment, the conversion scaling factor corrected may also be substituted into any $Y_t$ formula solved above, so that $Y_t$ can be calculated and acquired, and then $X_t$ may be calculated and acquired by substituting $Y_t$ into the Euclidean distance formula.

Wherein, because $X_1=X_2$, and $X_3=X_4$, as another probable implementation manner, the position coordinate of any known device may be used as an origin of the two-dimensional coordinate space. It is provided that the position coordinate of a second known device is used as the origin of the two-dimensional coordinate space, the position coordinate of the second known device may be simplified as $(0, 0)$, then the position coordinate of the first known device may be simplified as $(0, Y_1-Y_2)$, the position coordinate of a third known device may be simplified as $(X_3-X_2, Y_3-Y_2)$, and the position coordinate of a fourth known device may be simplified as $(X_4-X_2, Y_4-Y_2)$. The position coordinate of the target device may be simplified as $(X'_t, Y'_t)$.

The foregoing Euclidean distance formula may be simplified as:

$X_t'^2+(Y_t'-(Y_1-Y_2))_2=d_1^2$;  (1)

$X_t'^2+Y_t'^2=d_2^2$;  (2)

$(X_t'-(X_3-X_2))^2+Y_t'^2=d_3^2$;  (3)

$(X_t'-(X_4-X_2))^2+(Y_t'-(Y_4-Y_2))^2=d_4^2$  (4)

Therefore, as a probable implementation manner, the position coordinate of the target device may be calculated and acquired by using the foregoing formulas (1), (2) and (3).

Wherein, the following may be calculated and acquired through (1) and (2):

$$Y_t' = \frac{Y_1^2 - Y_2^2 - C_{cal}^2(R_2 - R_1)}{2(Y_1 - Y_2)};$$

and the following may be calculated and acquired through (2) and (3):

$$X_t' = \frac{X_3^2 - X_2^2 + C_{cal}^2(R_3 - R_2)}{2(X_3 - X_2)}.$$

Then, the coordinate value of each dimensional coordinate of the target device is:

$$X_t = \frac{X_3^2 - X_2^2 + C_{cal}^2(R_3 - R_2)}{2(X_3 - X_2)} + X_2;$$

-continued $$Y_t = \frac{Y_1^2 - Y_2^2 - C_{cal}^2(R_2 - R_1)}{2(Y_1 - Y_2)} + Y_2;$$

therefore, the calculation of the position coordinate value of the target device may be further simplified. According to the foregoing formulas, a plurality of coordinate values corresponding to each dimensional coordinate of the target device may be acquired with respect to each group of effective devices; by solving mean coordinate values and using the mean coordinate value of each dimensional coordinate to constitute the position coordinate of the target device, the position of the target device is acquired namely.

Certainly, when selecting more groups of effective devices, corrected values of a plurality of conversion scaling factors may be calculated and acquired, and the mean value of the corrected values of the plurality of conversion scaling factors is used to solve and acquire the coordinate value of each dimensional coordinate of the target device with respect to any group of effective devices, and constitute the position coordinate of the target device, i.e., acquire the position of the target device.

In addition, as another probable implementation manner, the position coordinate of the target device may be calculated and acquired by using the foregoing formulas (1), (3) and (4).

Wherein, the following may be calculated and acquired through the foregoing formulas (3) and (4):

$$Y_t' = \frac{Y_1^2 - Y_2^2 - C_{cal}^2(R_3 - R_4)}{2(Y_1 - Y_2)};$$

the following may be calculated and acquired through formulas (1) and (4):

$$X_t' = \frac{X_3^2 - X_2^2 + C_{cal}^2(R_4 - R_1)}{2(X_3 - X_2)};$$

therefore, the coordinate value of each dimensional coordinate of the target device may also be as follows:

$$X_t = \frac{X_3^2 - X_2^2 + C_{cal}^2(R_4 - R_1)}{2(X_3 - X_2)} + X_2;$$

$$Y_t = \frac{Y_1^2 - Y_2^2 - C_{cal}^2(R_3 - R_4)}{2(Y_1 - Y_2)} + Y_2.$$

It is explained hereinafter by taking a three-dimensional coordinate space as an example. In a group of effective devices, the position coordinate of the effective device may be represented as $(X_j, Y_j, Z_j)$, and the position coordinate of the target device is $(X_t, Y_t, Z_t)$. It is provided that X coordinates and Z coordinates of two effective devices located at the same side are equal, i.e., $X_1=X_2$, $X_3=X_4$, $Z_1=Z_2$, and $Z_3=Z_4$;

according to a Euclidean distance formula:

$$(X_t-X_1)^2+(Y_t-Y_1)^2+(Z_t-Z_1)^2=d_1^2;$$

$$(X_t-X_2)^2+(Y_t-Y_2)^2+(Z_t-Z_2)^2=d_2^2;$$

$$(X_t-X_3)^2+(Y_t-Y_3)^2+(Z_t-Z_3)^2=d_3^2;$$

$$(X_t-X_4)^2+(Y_t-Y_4)^2+(Z_t-Z_4)^2=d_4^2;$$

because $X_1=X_2$, $X_3=X_4$, $Z1=Z2$, and $Z3=Z4$, the Euclidean distance formula may be simplified as:

$$(Y_t-Y_1)^2=d_1^2;$$

$$(Y_t-Y_2)^2=d_2^2;$$

$$(Y_t-Y_3)^2=d_3^2;$$

$$(Y_t-Y_4)^2=d_4^2;$$

with reference to a distance conversion formula:

$$d_j^2=C_{cal}^2(R_0-R_j)$$

therefore, it may be calculated and acquired as follows:

$$Y_t = \frac{C_{cal}^2(R_2 - R_1) + Y_2^2 - Y_1^2}{2(Y_2 - Y_1)};$$

$$Y_t = \frac{C_{cal}^2(R_4 - R_3) + Y_4^2 - Y_3^2}{2(Y_4 - Y_3)};$$

let the two formulas be equal to each other, then the corrected value of the conversion scaling factor may be calculated and acquired as follows:

$$C_{cal}^2 = \frac{(Y_4^2 - Y_3^2)(Y_2 - Y_1) - (Y_2^2 - Y_1^2)(Y_4 - Y_3)}{(R_2 - R_1)(Y_4 - Y_3) - (R_4 - R_3)(Y_2 - Y_1)}.$$

After the corrected value of the conversion scaling factor is calculated and acquired, the position coordinate of the target device may be calculated and acquired according to the formula of the prior art.

Certainly, to further simplify the calculation of the position coordinate of the target device, because $X_1=X_2$, $X_3=X_4$, $Z_1=Z_2$, and $Z_3=Z_4$, the position coordinate of any known device may be used as an origin of the three-dimensional coordinate space. It is provided that the position coordinate of a first known device is used as the origin of the three-dimensional coordinate space, the position coordinate of the first known device may be simplified as (0, 0, 0) at this moment, then the position coordinate of the second known device may be simplified as (0, Y2−Y1, 0), the position coordinate of a third known device may be simplified as (0, 0, $Z_3-Z_1$), and the position coordinate of a fourth known device may be simplified as $(X_4-X_1, 0, 0)$. The position coordinate of the target device may be simplified as $X'_t, Y'_t$).

The foregoing Euclidean distance formula may be simplified as:

$$X_t'^2+Y_t'^2+Z_t'^2=d_1^2 \quad (5)$$

$$X_t'^2+(Y_t'-(Y_1-Y_2))^2+Z_t^2=d_2^2 \quad (6)$$

$$X_t'^2+Y_t'^2+(Z_t'-(Z_3-Z_1))^2=d_3^2 \quad (7)$$

$$(X_t'-(X_4-X_1))^2+(Y_t'-(Y_4-Y_1))^2=d_4^2 \quad (8)$$

Therefore, the following may be calculated and acquired through formula (5) and formula (8):

$$X_t' = \frac{C_{cal}^2(R_3 - R_2) + X_4^2 - X_1^2}{2(X_4 - X_1)};$$

the following may be calculated and acquired through formula (5) and formula (6):

$$Y'_t = \frac{C_{cal}^2(R_2 - R_1) + Y_2^2 - Y_1^2}{2(Y_2 - Y_1)};$$

the following may be calculated and acquired through formula (5) and formula (7):

$$Z'_t = \frac{C_{cal}^2(R_3 - R_1) + Z_3^2 - Z_1^2}{2(Z_3 - Z_1)}.$$

Therefore, the coordinate value of each dimensional coordinate of the target device is calculated and acquired as follows:

$$X_t = \frac{C_{cal}^2(R_3 - R_2) + X_4^2 - X_1^2}{2(X_4 - X_1)} + X_1;$$

$$Y_t = \frac{C_{cal}^2(R_2 - R_1) + Y_2^2 - Y_1^2}{2(Y_2 - Y_1)} + Y_1;$$

$$Z_t = \frac{C_{cal}^2(R_3 - R_1) + Z_3^2 - Z_1^2}{2(Z_3 - Z_1)} + Z_1.$$

A plurality of coordinate values corresponding to each dimensional coordinate of the target device may be acquired with respect to each group of effective devices; then the mean coordinate value of each dimensional coordinate is solved, so that the position coordinate of the target device is constituted by the mean coordinate value of each dimensional coordinate namely.

Moreover, based on the arrangement of the known devices in an indoor environment as shown in FIG. 5, as another embodiment, the adjusting the numerical value of a conversion scaling factor with respect to each group of four effective devices, and seeking a corrected value of the conversion scaling factor, may include:

determining that the target device is located at the straight line at which the two effective devices are located and a distance sum of the target device to the two effective devices respectively is equal to a distance between the two effective devices with respect to each group of four effective devices; and calculating and acquiring a corrected conversion factor of the target device according to a following calculation formula:

$$d_1 + d_2 = L;$$

$$d_1^2 = C_{cal}^2(R_0 - R_1);$$

$$d_2^2 = C_{cal}^2(R_0 - R_2).$$

wherein, L is a device distance between the two effective devices, $d_1$ and $d_2$ are corrected distances between the two effective devices and the target device respectively, and $R_1$ and $R_2$ are corresponding signal intensities of the two effective devices respectively.

The corrected value of the conversion scaling factor is calculated and acquired as follows:

$$C_{cal} = \frac{L}{\sqrt{R_0 - R_1} + \sqrt{R_0 - R_2}}.$$

That is, in the practical application, no matter which dimensional space is adopted, the space can be converted into one-dimensional space through selecting proper effective devices, so as to calculate and acquire the corrected value of the conversion scaling factor, so that the computational algorithm is simplified, and the positioning efficiency can be improved.

After the corrected value of the conversion scaling factor is calculated and acquired in the embodiment, the position of the target device may be calculated and acquired according to the prior art.

In order to improve the position acquisition exactitude, more groups of four effective devices may be selected, for example, five groups, i.e., 20 effective devices may be selected, so that corrected values of five conversion scaling factors may be calculated and acquired, and the coordinate value of each dimensional coordinate of the target device may be solved and acquired by using a mean value of the five corrected values to constitute the position coordinate of the target device and used as the final position of the target device.

Moreover, each corrected value may also be used to solve the coordinate value of each dimensional coordinate of the target device, and acquire a plurality of coordinate values corresponding to each dimensional coordinate; then the mean coordinate value of a plurality of coordinate values corresponding to each dimensional coordinate is solved, and the position coordinate of the target device is constituted by the mean coordinate value of each dimensional coordinate.

Therefore, as another embodiment, the position of the target device may be calculated and acquired according to a following calculation formula by using each corrected value of the conversion scaling factor acquired:

$$\frac{X_{tn} - X_{1n}}{X_{2n} - X_{1n}} = \frac{d_1}{d_1 + d_2};$$

$$d_1^2 = C_{cal}^2(R_0 - R_1);$$

$$d_2^2 = C_{cal}^2(R_0 - R_2);$$

Wherein, $X_{tn}$ is an n-dimensional coordinate of the target device, $X_{1n}$ is an n-dimensional coordinate of a first effective device, $X_{2n}$ is an effective device of a second effective device, $d_1$ is a corrected distance between the first effective device and the target device, $d_2$ is a corrected distance between the second effective device and the target device, n=1, 2, . . . , M, M is a dimension of a coordinate space, and M=1, 2, . . . .

Wherein, the position coordinate of the first effective device is $(X_{11}, X_{12}, \ldots, X_{1M})$, and the position coordinate of the second effective device is $(X_{21}, X_{22}, \ldots, X_{2M})$.

A position coordinate of the target device is $(X_{t1}, X_{t2}, \ldots, X_{tM})$.

Therefore, it may be calculated and acquired as follows:

$$X_{tn} = \frac{X_{1n}\sqrt{R_0 - R_2} + X_{2n}\sqrt{R_0 - R_1}}{\sqrt{R_0 - R_1} + \sqrt{R_0 - R_2}}.$$

Then, a mean coordinate value of the coordinate value of each dimensional coordinate of the target device may be calculated and acquired by using each corrected value to constitute a position coordinate of the position of the target device.

The calculation of the position coordinate of the target device will be illustrated hereinafter by taking a two-dimensional coordinate space and a three-dimensional coordinate space for example.

In the two-dimensional coordinate space, the position coordinate of the first effective device may be represented as $(X_1, Y_1)$, the position coordinate of the second effective device may be represented as $(X_2, Y_2)$, and the position coordinate of the target device may be represented as $(X_t, Y_t)$.

Therefore, according to a following calculation formula:

$$\frac{X_t - X_1}{X_2 - X_1} = \frac{d_1}{d_1 + d_2};$$

$$\frac{Y_t - Y_1}{Y_2 - Y_1} = \frac{d_1}{d_1 + d_2};$$

$$d_1^2 = C_{cal}^2 (R_0 - R_1);$$

$$d_2^2 = C_{cal}^2 (R_0 - R_2);$$

therefore, the coordinate value of each dimensional coordinate of the target device may be calculated and acquired as follows:

$$X_t = \frac{X_1 \sqrt{R_0 - R_2} + X_2 \sqrt{R_0 - R_1}}{\sqrt{R_0 - R_1} + \sqrt{R_0 - R_2}}.$$

$$Y_t = \frac{Y_1 \sqrt{R_0 - R_2} + Y_2 \sqrt{R_0 - R_1}}{\sqrt{R_0 - R_1} + \sqrt{R_0 - R_2}}.$$

In the three-dimensional coordinate space, the position coordinate of the first effective device may be represented as $(X_1, Y_1, Z_1)$, the position coordinate of the second effective device may be represented as $(X_2, Y_2, Z_2)$, and the position coordinate of the target device may be represented as $(X_t, Y_t, Z_t)$.

Therefore, according to a following calculation formula:

$$\frac{X_t - X_1}{X_2 - X_1} = \frac{d_1}{d_1 + d_2};$$

$$\frac{Y_t - Y_1}{Y_2 - Y_1} = \frac{d_1}{d_1 + d_2};$$

$$\frac{Z_t - Z_1}{Z_2 - Z_1} = \frac{d_1}{d_1 + d_2};$$

$$d_1^2 = C_{cal}^2 (R_0 - R_1);$$

$$d_2^2 = C_{cal}^2 (R_0 - R_2);$$

therefore, the coordinate value of each dimensional coordinate of the target device may be calculated and acquired as follows:

$$X_t = \frac{X_1 \sqrt{R_0 - R_2} + X_2 \sqrt{R_0 - R_1}}{\sqrt{R_0 - R_1} + \sqrt{R_0 - R_2}}.$$

$$Y_t = \frac{Y_1 \sqrt{R_0 - R_2} + Y_2 \sqrt{R_0 - R_1}}{\sqrt{R_0 - R_1} + \sqrt{R_0 - R_2}}.$$

$$Z_t = \frac{Z_1 \sqrt{R_0 - R_2} + Z_2 \sqrt{R_0 - R_1}}{\sqrt{R_0 - R_1} + \sqrt{R_0 - R_2}}.$$

Figure 7:
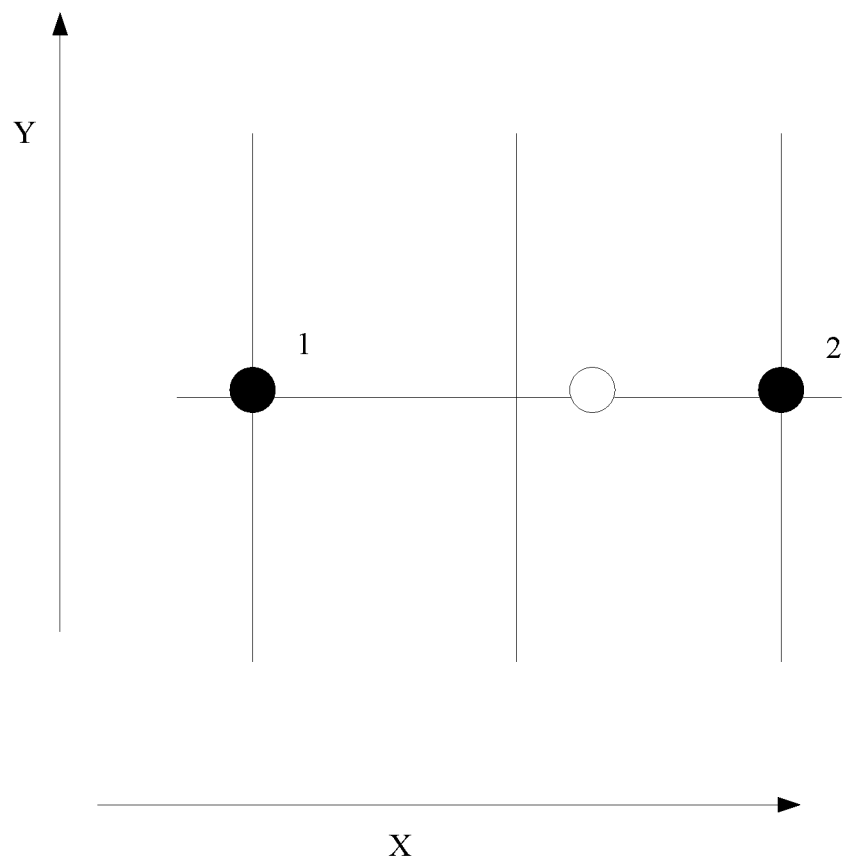
FIG. 7 is another schematic diagram of selecting effective devices in the embodiments of the present application.

Wherein, in a special case as shown in FIG. 7, it is provided that Y coordinates of the effective device and the target device in the two-dimensional coordinate space are equal.

At this moment, $d_1 + d_2 = L$, and $L = X_2 - X_1$;
$X_t = X_1 + d_1 = X_2 - d_2$;

therefore, the coordinate value of each dimensional coordinate of the target device may be namely calculated and acquired as follows:

$$X_t = \frac{X_1 \sqrt{R_0 - R_2} + X_2 \sqrt{R_0 - R_1}}{\sqrt{R_0 - R_1} + \sqrt{R_0 - R_2}};$$

$$Y_t = Y_2 = Y_1.$$

According to the embodiments of the present application, the conversion scaling factor is adjusted to acquire the corrected value of the conversion scaling factor, so that the position acquisition accuracy of the target device is improved.

Figure 8:
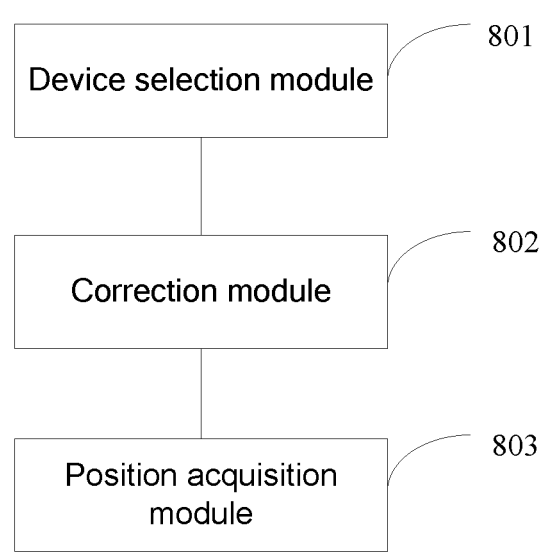
FIG. 8 is a structural schematic diagram of one embodiment of a position acquisition apparatus of the embodiments of the present application.

FIG. 8 is a structural schematic diagram of one embodiment of a position acquisition apparatus provided by the embodiments of the present application. The apparatus may be specifically configured in a computer system, thus implementing position acquisition through the computer system.

The apparatus may include:

a device selection module 801 configured to select at least one group of N effective devices from known devices that transmit signals to a target device or known devices that receive signals transmitted by the target device;

a correction module 802 configured to adjust a numerical value of a conversion scaling factor with respect to each group of N effective devices, and seek a corrected value of the conversion scaling factor, the corrected value enabling N circles or spheres formed by taking a position of each effective device as a center and a corrected distance between each effective device and the target device as a radius to have a unique intersection, and a position acquisition module 803 configured to calculate and acquire a position of the target device by using at least one corrected value of the conversion scaling factor acquired.

In the embodiment, the corrected value is acquired by adjusting the numerical value of the conversion scaling factor, wherein the corrected value enables the N circles or spheres formed by taking the corrected distance between N effective devices and the target device as the radius to have the unique intersection which is namely the position of the target device, so that the position of the target device can be acquired. In the embodiment of the present application, the corrected value is sought by adjusting the conversion scaling factor, so that the position acquisition accuracy of the target device is improved.

Wherein, as another embodiment, the correction module may be specifically configured to:

enlarge or reduce the numerical value of the conversion scaling factor from an initial value of the conversion scaling factor, and use a current adjusted value of the conversion scaling factor as the corrected value of the conversion scaling factor when the current adjusted value enables the N circles or spheres formed by taking the position of each effective device as the center and the corrected distance between each effective device and the target device as the radius to have the unique intersection.

At this moment, N is an integer greater than a dimension of a coordinate space.

As another embodiment, the correction module may be specifically configured to:

select any effective device from the N effective devices as a judgment device, and use other N−1 effective devices as positioning devices;

start from taking the initial value of the conversion scaling factor as the current adjusted value, judge whether N−1 circles or spheres formed by taking a current distance between the N−1 effective devices and the target device as a radius to have an intersection and whether a current distance between the judgment device and the target device is equal to an intersection distance between the judgment device and any intersection position, wherein, the current distance is calculated and acquired by using a current value of the conversion scaling factor;

if yes, use the current value of the conversion scaling factor as the corrected value of the conversion scaling factor;

if not, compare the current distance between the judgment device and the target device with a first intersection distance between the judgment device and an intersection position close to the judgment device, a second intersection distance between the judgment device and an intersection position far from the judgment device, and a center distance between the judgment device and a central point of a connecting line of the two intersection positions respectively when the N−1 circles or spheres have two intersection positions;

if the current distance is less than the first intersection distance and less than the center distance, or the current distance is less than the second intersection distance and greater than the center distance, enlarge the conversion scaling factor;

if the current distance is greater than the first intersection distance and less than the center distance, or the current distance is greater than the second intersection distance and greater than the center distance, or the current distance is greater than the first intersection distance and equal to the center distance, and a current distance between the judgment device and the target device is equal to current distances between the positioning devices and the target device respectively, reduce the conversion scaling factor;

if the current distance is equal to the center distance, and the current distance between the judgment device and the target device is unequal to the current distances between the positioning devices and the target device respectively, reselect one effective device as a judgment device and use other N−1 effective devices as positioning devices to perform continuously; and when the N−1 circles or spheres have no intersections and are externally separated from each other, and the N−1 circles or spheres are externally separated from a circle or sphere formed by taking the current distance between the judgment device and the target device as a radius respectively, and current distances between the N effective devices and the target device are equal, enlarge the conversion scaling factor.

Wherein, when a position coordinate of the N effective devices is a two-dimensional coordinate, N is equal to 3;

when the N−1 circles have one intersection position and are externally tangent, the correction module is further configured to:

If the circle formed by taking the current distance between the judgment device and the target device as the radius is externally separated from any one of the N−1 circles, reselect one group of N effective devices to perform continuously; and if the circle formed by taking the current distance between the judgment device and the target device as the radius is intersected with any circle in the N−1 circles, reduce the conversion scaling factor;

When the N−1 circles have one intersection position and are internally tangent, the correction module is further configured to:

if the circle formed by taking the current distance between the judgment device and the target device as the radius is externally separated from all the N−1 circles, reselect one group of N effective devices to perform continuously;

when a position coordinate of the N effective devices is a three-dimensional coordinate, N is equal to 4; and when the N−1 spheres have no intersection and any two spheres are internally contained, the correction module is further configured to trigger the device selection module to reselect one group of N effective devices.

As another embodiment, when a position coordinate of the N effective devices is a one-dimensional coordinate, N is equal to 2; and the correction module is specifically configured to:

select one from the two effective devices as a positioning device and the other as a judgment device;

when a device distance between the positioning device and the judgment device is less than an initial distance between the judgment device and the target device, acquire the corrected value of the conversion scaling factor according to a following calculation formula:

$$d_1 - d_2 = L;$$

$$d_1^2 = C_{cal}^2 (R_0 - R_1);$$

$$d_2^2 = C_{cal}^2 (R_0 - R_2);$$

wherein, L is a distance between the positioning device and the judgment device, $R_1$ is a corresponding signal intensity of the judgment device, and $R_2$ is a corresponding signal intensity of the positioning device; $C_{cal}$ is the corrected value of the conversion scaling factor, $d_1$ is a corrected distance between the judgment device and the target device, and $d_2$ is a corrected distance between the positioning device and the target device;

therefore, the corrected value of the conversion scaling factor is calculated and acquired as follows:

$$C_{cal} = \frac{L}{\sqrt{R_0 - R_1} + \sqrt{R_0 - R_2}};$$

it should be illustrated that a square root of the foregoing formula needs to be a positive value.

When the device distance between the positioning device and the judgment device is greater than the initial distance between the judgment device and the target device, the corrected value of the conversion scaling factor is calculated and acquired according to a following calculation formula:

$$d_1 + d_2 = L;$$

$$d_1^2 = C_{cal}^2 (R_0 - R_1);$$

$$d_2^2 = C_{cal}^2 (R_0 - R_2).$$

Therefore, the corrected value of the conversion scaling factor is calculated and acquired as follows:

$$C_{cal} = \frac{L}{\sqrt{R_0 - R_1} + \sqrt{R_0 - R_2}};$$

it should be illustrated that a square root of the foregoing formula needs to be a positive value.

During practical applications, for example, in a supermarket or a warehouse or other large scale places, the known devices in the embodiments of the present application may be known devices preset indoors with known positions. As shown in FIG. 5, an effective region range of the known devices for receiving or transmitting signals is a semicircle or semisphere, and a plurality of known devices are respectively disposed at two opposite sides of each mobile region of the target device; and the effective region range of the known devices is within the mobile region.

Therefore, as another embodiment, the device selection module may be specifically configured to:

select four effective devices having unequal signal intensities located at two opposite sides with two effective devices comprised at each side according to a signal intensity sequence from strong to weak from the known devices that transmit signals to the target device or the known devices that receive signals transmitted by the target device, wherein only coordinate values corresponding to one coordinate axes in position coordinates of the two effective devices located at the same side are unequal, and the effective region range of the known devices for receiving or transmitting signals is a semicircle or semisphere;

the correction module may be specifically configured to:

determine that the target device is within a region range formed by connecting the four effective devices with respect to each group of four effective devices; and calculate and acquire a corrected conversion factor of the target device according to a following calculation formula:

$$d_j^2 = (X_{tn} - X_{jn})^2;$$

$$d_j^2 = C_{cal}^2(R_0 - R_j);$$

wherein, a position coordinate of a $j^{th}$ effective device is $(X_{j1}, X_{j2}, \ldots, X_{jm})$, M is a dimension of a coordinate space, and M=1, 2, 3 . . . .

wherein, j=1, 2, 3 and 4, $X_{jm}$ is an m-dimensional coordinate of the $j^{th}$ effective device, and $X_{tm}$ is an m-dimensional coordinate of the target device; and $d_j$ is a corrected distance between the $j^{th}$ effective device and the target device, wherein, m-dimensional coordinates of the four effective devices are unequal.

Based on FIG. 5, the effective region range of the known devices for receiving or transmitting signals is a semicircle or semisphere; and a plurality of known devices are respectively disposed at two opposite sides of each mobile region of the target device; and the effective region range of the known devices is within the mobile region; as another embodiment, the device selection module may be specifically configured to:

select two effective devices located at the same straight line according to a signal intensity sequence from strong to weak from the known devices that transmit signals to the target device or the known devices that receive signals transmitted by the target device; and the correction module is specifically configured to:

determine that the target device is located at the straight line at which the two effective devices are located and a distance sum of the target device to the two effective devices respectively is equal to a distance between the two effective devices with respect to each group of two effective devices; and calculate and acquire a corrected conversion factor of the target device according to a following calculation formula:

$$d_1 + d_2 = L;$$

$$d_1^2 = C_{cal}^2(R_0 - R_1);$$

$$d_2^2 = C_{cal}^2(R_0 - R_2).$$

wherein, L is a device distance between the two effective devices, $d_1$ and $d_2$ are corrected distances between the two effective devices and the target device respectively, and $R_1$ and $R_2$ are corresponding signal intensities of the two effective devices respectively.

After the corrected conversion scaling factor is acquired in the embodiment, the position of the target device may be calculated and acquired according to the prior art.

Certainly, as another embodiment, the position acquisition module may be specifically configured to:

calculate and acquire a coordinate value of each dimensional coordinate of the target device according to a following calculation formula by using the corrected value of the conversion scaling factor acquired:

$$\frac{X_{tn} - X_{1n}}{X_{2n} - X_{1n}} = \frac{d_1}{d_1 + d_2};$$

$$d_1^2 = C_{cal}^2(R_0 - R_1);$$

$$d_2^2 = C_{cal}^2(R_0 - R_2);$$

wherein, $X_{tn}$ is an n-dimensional coordinate of the target device, $X_{1n}$ is an n-dimensional coordinate of a first effective device, $X_{2n}$ is an n-dimensional coordinate of a second effective device, $d_1$ is a corrected distance between the first effective device and the target device, and $d_2$ is a corrected distance between the second effective device and the target device; n=1, 2, . . . , M, wherein M is a dimension of a coordinate space, and M=1, 2, . . . , 3.

Wherein, the position coordinate of the first effective device is $(X_{11}, X_{12}, \ldots, X_{1M})$, and the position coordinate of the second effective device is $(X_{21}, X_{21}, \ldots, X_{21M})$.

A position coordinate of the target device is $(X_{t1}, X_{t2}, \ldots, X_{tM})$.

Therefore, it may be calculated and acquired as follows:

$$X_{tn} = \frac{X_{1n}\sqrt{R_0 - R_2} + X_{2n}\sqrt{R_0 - R_1}}{\sqrt{R_0 - R_1} + \sqrt{R_0 - R_2}}.$$

The embodiment of the present application improves the position acquisition accuracy of the target device by seeking the correction value of the conversion scaling factor, and reduces the problem that the position acquisition is inaccurate due to the signal intensity errors.

The functions described in the methods of the embodiments of the present application may be stored in a computing device readable storage medium if being implemented in a form of software functional units and sold or used as an independent product. Based on such understanding, the part of the embodiments of the present application contributing to the prior art, or the part of the technical solution may be implemented in the form of a software product. The computer software product is stored in a storage medium, and includes several instructions for instructing a computing device (which may be a personal computer, a server, a mobile computing device or a network device so on) to execute all or a part of steps of the method according to each embodiment of the present application. While the forementioned storage medium includes: any medium that is capable of storing program codes, such as a USB disk, a mobile hard disk drive, a read-only memory (ROM, Read-Only Memory), a random access memory (RAM, Random Access Memory), a magnetic disk, or an optical disk.

The explanation above shows and describes a plurality of preferred embodiments of the present application, but as previously mentioned, it should be understood that the present application is not limited to the forms disclosed herein, and shall not be deemed as an exclusion to other embodiments, but can be applied to various other combinations, amendments and circumstances, and can be modified through the foregoing teaching or technologies or knowledge of related arts within the scope of the application concept herein. While modifications and changes made by those skilled in the art without departing from the spirit and scope of the present application shall all fall within the protection scope of the claims of the present application appended.

The invention claimed is:

1. A position acquisition method, comprising:
   selecting at least one group of N auxiliary devices from known devices that transmit signals to a target device or known devices that receive signals transmitted by the target device, wherein N is equal to a dimension of a coordinate space plus 1, the known devices are devices with known positions in a coordinate space, and the known devices and the target device transmit signals wirelessly with each other;
   adjusting a numerical value of a conversion scaling factor with respect to each group of N auxiliary devices, and seeking a corrected value of the conversion scaling factor, the corrected value enabling N circles or spheres formed by taking a position of each auxiliary device as a center and a corrected distance between each auxiliary device and the target device as a radius to have a unique intersection; wherein the conversion scaling factor is used to convert a signal intensity of the signal transmitted by the auxiliary device towards the target device or the signal received by the auxiliary device from the target device into a distance; and
   calculating and acquiring a position of the target device by using at least one corrected value of the conversion scaling factor acquired, and taking the calculated and acquired position of the target device as a unique position of the target device for position management, monitoring or tracking.

2. The method according to claim 1, wherein N is an integer greater than a dimension of a coordinate space; and
   the adjusting the numerical value of the conversion scaling factor, and acquiring the corrected value of the conversion scaling factor, to enable N circles or spheres formed by taking the position of each auxiliary device as the center and the corrected distance between each auxiliary device and the target device as the radius to have the unique intersection, comprises:
   enlarging or reducing the numerical value of the conversion scaling factor from an initial value of the conversion scaling factor, and taking a current adjusted value of the conversion scaling factor as the corrected value of the conversion scaling factor when the current adjusted value enables the N circles or spheres formed by taking the position of each auxiliary device as the center and the corrected distance between each auxiliary device and the target device as the radius to have the unique intersection.

3. The method according to claim 2, wherein the enlarging or reducing the numerical value of the conversion scaling factor from the initial value of the conversion scaling factor, and taking the current adjusted value of the conversion scaling factor as the corrected value of the conversion scaling factor when the current adjusted value enables the N circles or spheres formed by taking the position of each auxiliary device as the center and the corrected distance between each auxiliary device and the target device as the radius to have the unique intersection, comprises:
   selecting any auxiliary device from the N auxiliary devices as a judgment device, and taking other N−1 auxiliary devices as positioning devices;
   starting from taking the initial value of the conversion scaling factor as the current adjusted value, judging whether N−1 circles or spheres have an intersection and judging whether a current distance between the judgment device and the target device is equal to an intersection distance between the judgment device and any intersection position; wherein, the N−1 circles or spheres are formed by taking a position of each of the N−1 auxiliary devices as a center and a current distance between the each of the N−1 auxiliary devices and the target device as a radius respectively; and wherein, the current distance is calculated by using a current value of the conversion scaling factor;
   if yes, taking the current value of the conversion scaling factor as the corrected value of the conversion scaling factor;
   if not, comparing the current distance between the judgment device and the target device with a first intersection distance between the judgment device and an intersection position close to the judgment device, a second intersection distance between the judgment device and an intersection position far from the judgment device, and a center distance between the judgment device and a central point of a connecting line of the two intersection positions respectively when the N−1 circles or spheres have two intersection positions;
   if the current distance is less than the first intersection distance and less than the center distance, or the current distance is less than the second intersection distance and greater than the center distance, enlarging the conversion scaling factor;
   if the current distance is greater than the first intersection distance and less than the center distance, or the current distance is greater than the second intersection distance and greater than the center distance; or the current distance is greater than the first intersection distance and equal to the center distance, and a current distance between the judgment device and the target device is equal to current distances between the positioning devices and the target device respectively, reducing the conversion scaling factor;
   if the current distance is equal to the center distance, and the current distance between the judgment device and the target device is unequal to the current distances between the positioning devices and the target device respectively, reselecting one auxiliary device as a judgment device and taking other N−1 auxiliary devices as positioning devices; and when the N−1 circles or spheres have no intersections and are externally separated from each other, and the N−1 circles or spheres are externally separated from a circle or sphere formed by taking the current distance between the judgment device and the target device as a radius respectively, and current distances between the N auxiliary devices and the target device are equal, enlarging the conversion scaling factor.

4. The method according to claim 3, wherein when a position coordinate of the N auxiliary devices is a two-dimensional coordinate, N is equal to 3;
when the N−1 circles have one intersection position and are externally tangent, the method further comprises:
if the circle formed by taking the current distance between the judgment device and the target device as the radius comprises any circle in the N−1 circles, reselecting one group of N auxiliary devices; and
if the circle formed by taking the current distance between the judgment device and the target device as the radius is intersected with any circle in the N−1 circles, reducing the conversion scaling factor;
when the N−1 circles have one intersection position and are internally tangent, the method further comprises:
if the circle formed by taking the current distance between the judgment device and the target device as the radius is externally separated from all the N−1 circles, reselecting one group of N auxiliary devices;
when a position coordinate of the N auxiliary devices is a three-dimensional coordinate, N is equal to 4; and
when the N−1 spheres have no intersection and any two spheres are internally contained, the method further comprises:
reselecting one group of N auxiliary devices.

5. The method according to claim 1, wherein when a position coordinate of the N auxiliary devices is a one-dimensional coordinate, N is equal to 2; and
the adjusting the numerical value of the conversion scaling factor with respect to each group of N auxiliary devices, and seeking the corrected value of the conversion scaling factor, comprises:
selecting one from the two auxiliary devices as a positioning device and the other as a judgment device;
when a device distance between the positioning device and the judgment device is less than an initial distance between the judgment device and the target device, acquiring the corrected value of the conversion scaling factor according to a following calculation formula:

$d_1 - d_2 = L;$ $d_1^2 = C_{cal}^2 (R_0 - R_1);$ $d_2^2 = C_{cal}^2 (R_0 - R_2);$ wherein, L is a distance between the two auxiliary devices, $R_0$ is a corresponding signal intensity of an international standard value, $R_1$ is a corresponding signal intensity of the judgment device, and $R_2$ is a corresponding signal intensity of the positioning device; $C_{cal}$ is the corrected value of the conversion scaling factor, $d_1$ is a corrected distance between the judgment device and the target device, and $d_2$ is a corrected distance between the positioning device and the target device; and
when the device distance between the positioning device and the judgment device is greater than the initial distance between the judgment device and the target device, acquiring the corrected value of the conversion scaling factor according to a following calculation formula:

$d_1 + d_2 = L;$ $d_1^2 = C_{cal}^2 (R_0 - R_1);$ $d_2^2 = C_{cal}^2 (R_0 - R_2).$ 6. The method according to claim 1, wherein an effective region range of the known devices for receiving or transmitting signals is a semicircle or semisphere, and a plurality of known devices are respectively disposed at two opposite sides of each mobile region of the target device; and the effective region range of the known devices is within the mobile region; wherein the effective region range is a region range that signals received or transmitted inside are not shielded;
the selecting at least one group of N auxiliary devices from known devices that transmit signals to the target device or known devices that receive signals transmitted by the target device comprises:
selecting four auxiliary devices having unequal signal intensities located at two opposite sides with two auxiliary devices comprised at each side according to a descending order of a signal intensity from the known devices that transmit signals to the target device or the known devices that receive signals transmitted by the target device, wherein only coordinate values corresponding to one coordinate axes in position coordinates of the two auxiliary devices located at the same side are unequal, and the effective region range of the known devices for receiving or transmitting signals is a semicircle or semisphere;
the adjusting the numerical value of the conversion scaling factor with respect to each group of four auxiliary devices, and seeking the corrected value of the conversion scaling factor, comprises:
determining that the target device is within a region range formed by connecting the four auxiliary devices with respect to each group of four auxiliary devices; and
calculating and acquiring a corrected conversion factor of the target device according to a following calculation formula:

$d_j^2 = (X_{tm} - X_{jm})^2;$ $d_j^2 = C_{cal}^2 (R_0 - R_j);$ wherein, j=1, 2, 3 and 4, $X_{jm}$ is an m-dimensional coordinate of a $j^{th}$ auxiliary device, and $X_{tm}$ is an m-dimensional coordinate of the target device; $d_j$ is a corrected distance between the $j^{th}$ auxiliary device and the target device, $R_0$ is a corresponding signal intensity of an international standard value, and $R_j$ is a corresponding signal intensity of the $j^{th}$ auxiliary device, wherein, m-dimensional coordinates of the four auxiliary devices are unequal.

7. The method according to claim 1, wherein an effective region range of the known devices for receiving or transmitting signals is a semicircle or semisphere, and a plurality of known devices are respectively disposed at two opposite sides of each mobile region of the target device; and the effective region range of the known devices is within the mobile region; wherein the effective region range is a region range that signals received or transmitted inside are not shielded;
the selecting at least one group of N auxiliary devices from known devices that transmit signals to the target device or known devices that receive signals transmitted by the target device comprises:
selecting two auxiliary devices located at the same straight line according to a descending order of a signal intensity from the known devices that transmit signals to the target device or the known devices that receive signals transmitted by the target device; and
the adjusting the numerical value of a conversion scaling factor with respect to each group of four auxiliary devices, and seeking the corrected value of the conversion scaling factor, comprises:
determining that the target device is located at the straight line at which the two auxiliary devices are located and a distance sum of the target device to the two auxiliary devices respectively is equal to a distance between the two auxiliary devices with respect to each group of four auxiliary devices; and
calculating and acquiring a corrected conversion factor of the target device according to a following calculation formula:

$d_1 + d_2 = L;$ $d_1^2 = C_{cal}^2 (R_0 - R_1);$ $d_2^2 = C_{cal}^2 (R_0 - R_2);$ wherein, L is a device distance between the two auxiliary devices, $d_1$ and $d_2$ are corrected distances between the two auxiliary devices and the target device respectively, $R_0$ is a corresponding signal intensity of an international standard value, and $R_1$ and $R_2$ are corresponding signal intensities of the two auxiliary devices respectively.

8. The method according to claim 7, wherein the calculating and acquiring the position of the target device by using at least one corrected value of the conversion scaling factor acquired comprises:
calculating and acquiring a coordinate value of each dimensional coordinate of the target device according to a following calculation formula by using the corrected value of the conversion scaling factor acquired:

$$\frac{X_{tn} - X_{1n}}{X_{2n} - X_{1n}} = \frac{d_1}{d_1 + d_2};$$
$$d_1^2 = C_{cal}^2 (R_0 - R_1);$$
$$d_2^2 = C_{cal}^2 (R_0 - R_2);$$

wherein, $X_{tn}$ is an n-dimensional coordinate of the target device, $X_{1n}$ is an n-dimensional coordinate of a first auxiliary device, $X_{2n}$ is an n-dimensional coordinate of a second auxiliary device, $d_1$ is a corrected distance between the first auxiliary device and the target device, and $d_2$ is a corrected distance between the second auxiliary device and the target device; and
using a mean coordinate value of the coordinate value of each dimensional coordinate of the target device calculated and acquired by using each corrected value to constitute a position coordinate of the position of the target device.

9. The method according to claim 1, the method is used in an indoor positioning scene.

10. A position acquisition apparatus, comprising:
a memory storing instructions; and
a processor configured to execute the instructions to:
select at least one group of N auxiliary devices from known devices that transmit signals to a target device or known devices that receive signals transmitted by the target device, wherein N is equal to a dimension of a coordinate space plus 1, the known devices are devices with known positions in a coordinate space, and the known devices and the target device transmit signals wirelessly with each other;
adjust a numerical value of a conversion scaling factor with respect to each group of N auxiliary devices, and seek a corrected value of the conversion scaling factor, the corrected value enabling N circles or spheres formed by taking a position of each auxiliary device as a center and a corrected distance between each auxiliary device and the target device as a radius to have a unique intersection, wherein, the conversion scaling factor is used to convert a signal intensity of the signal transmitted by the auxiliary device towards the target device or the signal received by the auxiliary device from the target device into a distance; and
calculate and acquire a position of the target device by using at least one corrected value of the conversion scaling factor acquired, and taking the calculated and acquired position of the target device as a unique position of the target device for position management, monitoring or tracking.

11. The apparatus according to claim 10, wherein the apparatus is specifically configured to:
enlarge or reduce the numerical value of the conversion scaling factor from an initial value of the conversion scaling factor, and take a current adjusted value of the conversion scaling factor as the corrected value of the conversion scaling factor when the current adjusted value enables the N circles or spheres formed by taking the position of each auxiliary device as the center and the corrected distance between each auxiliary device and the target device as the radius to have the unique intersection.

12. The apparatus according to claim 11, wherein the apparatus is specifically configured to:
select any auxiliary device from the N auxiliary devices as a judgment device, and take other N−1 auxiliary devices as positioning devices;
start from taking the initial value of the conversion scaling factor as the current adjusted value, judge whether N−1 circles or spheres have an intersection and whether a current distance between the judgment device and the target device is equal to an intersection distance between the judgment device and any intersection position, wherein, the N−1 circles or spheres are formed by taking a position of each of the N−1 auxiliary devices as a center and a current distance between the each of the N−1 auxiliary devices and the target device as a radius respectively, and wherein the current distance is calculated and acquired by using a current value of the conversion scaling factor;
if yes, take the current value of the conversion scaling factor as the corrected value of the conversion scaling factor;
if not, compare the current distance between the judgment device and the target device with a first intersection distance between the judgment device and an intersection position close to the judgment device, a second intersection distance between the judgment device and an intersection position far from the judgment device, and a center distance between the judgment device and a central point of a connecting line of the two intersection positions respectively when the N−1 circles or spheres have two intersection positions;
if the current distance is less than the first intersection distance and less than the center distance, or the current distance is less than the second intersection distance and greater than the center distance, enlarge the conversion scaling factor;
if the current distance is greater than the first intersection distance and less than the center distance, or the current distance is greater than the second intersection distance and greater than the center distance, or the current distance is greater than the first intersection distance and equal to the center distance, and a current distance between the judgment device and the target device is equal to current distances between the positioning devices and the target device respectively, reduce the conversion scaling factor;
if the current distance is equal to the center distance, and the current distance between the judgment device and the target device is unequal to the current distances between the positioning devices and the target device respectively, reselect one auxiliary device as a judgment device and take other N−1 auxiliary devices as positioning devices; and
when the N−1 circles or spheres have no intersections and are externally separated from each other, and the N−1 circles or spheres are externally separated from a circle or sphere formed by taking the current distance between the judgment device and the target device as a radius respectively, and current distances between the N auxiliary devices and the target device are equal, enlarge the conversion scaling factor.

13. The apparatus according to claim 12, wherein when a position coordinate of the N auxiliary devices is a two-dimensional coordinate, N is equal to 3;
when the N−1 circles have one intersection position and are externally tangent, the apparatus is further configured to:
if the circle formed by taking the current distance between the judgment device and the target device as the radius is externally separated from all the N−1 circles, reselect one group of N auxiliary devices; and
if the circle formed by taking the current distance between the judgment device and the target device as the radius is intersected with any circle in the N−1 circles, reduce the conversion scaling factor;
when the N−1 circles have one intersection position and are internally tangent, the apparatus is further configured to:
if the circle formed by taking the current distance between the judgment device and the target device as the radius is externally separated from all the N−1 circles, reselect one group of N auxiliary devices;
when a position coordinate of the N auxiliary devices is a three-dimensional coordinate, N is equal to 4; and
when the N−1 spheres have no intersection and any two spheres are internally contained, the apparatus is further configured to reselect one group of N auxiliary devices.

14. The apparatus according to claim 10, wherein when a position coordinate of the N auxiliary devices is a one-dimensional coordinate, N is equal to 2; and
the apparatus is specifically configured to:
select one from the two auxiliary devices as a positioning device and the other as a judgment device;
when a device distance between the positioning device and the judgment device is less than an initial distance between the judgment device and the target device, acquire the corrected value of the conversion scaling factor according to a following calculation formula:

$$d_1 - d_2 = L;$$

$$d_1^2 = C_{cal}^2 (R_0 - R_1);$$

$$d_2^2 = C_{cal}^2 (R_0 - R_2);$$

wherein, L is a distance between the two auxiliary devices, $R_0$ is a corresponding signal intensity of an international standard value, $R_1$ is a corresponding signal intensity of the judgment device, and $R_2$ is a corresponding signal intensity of the positioning device; $C_{cal}$ is the corrected value of the conversion scaling factor, $d_1$ is a corrected distance between the judgment device and the target device, and $d_2$ is a corrected distance between the positioning device and the target device; and
when the device distance between the positioning device and the judgment device is greater than the initial distance between the judgment device and the target device, acquire the corrected value of the conversion scaling factor according to a following calculation formula:

$$d_1 + d_2 = L;$$

$$d_1^2 = C_{cal}^2 (R_0 - R_1);$$

$$d_2^2 = C_{cal}^2 (R_0 - R_2).$$

15. The apparatus according to claim 10, wherein an effective region range of the known devices for receiving or transmitting signals is a semicircle or semisphere, and a plurality of known devices are respectively disposed at two opposite sides of each mobile region of the target device; and the effective region range of the known devices is within the mobile region; wherein the effective region range is a region range that signals received or transmitted inside are not shielded, and the mobile region an indoor activity range of the target device;
the apparatus is specifically configured to:
select four auxiliary devices having unequal signal intensities located at two opposite sides with two auxiliary devices comprised at each side according to a descending order of a signal intensity from the known devices that transmit signals to the target device or the known devices that receive signals transmitted by the target device, wherein only coordinate values corresponding to one coordinate axes in position coordinates of the two auxiliary devices located at the same side are unequal, and the effective region range of the known devices for receiving or transmitting signals is a semicircle or semisphere;
the apparatus is specifically configured to:
determine that the target device is within a region range formed by connecting the four auxiliary devices with respect to each group of four auxiliary devices; and
calculate and acquire a corrected conversion factor of the target device according to a following calculation formula:

$$d_j^2 = (X_{tn} - X_{jm})^2;$$

$$d_j^2 = C_{cal}^2 (R_0 - R_j);$$

wherein, j=1, 2, 3 and 4, $X_{jm}$ is an m-dimensional coordinate of a $j^{th}$ auxiliary device, and $X_{tm}$ is an m-dimensional coordinate of the target device; $d_j$ is a corrected distance between the $j^{th}$ auxiliary device and the target device, $R_0$ is a corresponding signal intensity of an international standard value, and $R_j$ is a corresponding signal intensity of the $j^{th}$ auxiliary device, wherein, m-dimensional coordinates of the four auxiliary devices are unequal.

16. The apparatus according to claim 10, wherein an effective region range of the known device for receiving or transmitting signals is a semicircle or semisphere, and a plurality of known devices are respectively disposed at two opposite sides of each mobile region of the target device; and the effective region range of the known devices is within the mobile region; wherein the effective region range is a region range that signals received or transmitted inside are not shielded, and the mobile region an indoor activity range of the target device;

the apparatus is specifically configured to:
select two auxiliary devices located at the same straight line according to a descending order of a signal intensity from the known devices that transmit signals to the target device or the known devices that receive signals transmitted by the target device; and the apparatus is specifically configured to:
determine that the target device is located at the straight line at which the two auxiliary devices are located and a distance sum of the target device to the two auxiliary devices respectively is equal to a distance between the two auxiliary devices with respect to each group of four auxiliary devices; and calculate and acquire a corrected conversion factor of the target device according to a following calculation formula:

$d_1+d_2=L;$ $d_1^2=C_{cal}^2(R_0-R_1);$ $d_2^2=C_{cal}^2(R_0-R_2);$ wherein, L is a device distance between the two auxiliary devices, $d_1$ and $d_2$ are corrected distances between the two auxiliary devices and the target device respectively, $R_0$ is a corresponding signal intensity of an international standard value, and $R_1$ and $R_2$ are corresponding signal intensities of the two auxiliary devices respectively.

17. The apparatus according to claim 16, wherein the apparatus is specifically configured to:
calculate and acquire a coordinate value of each dimensional coordinate of the target device according to a following calculation formula by using the corrected value of the conversion scaling factor acquired:

$$\frac{X_{tn} - X_{1n}}{X_{2n} - X_{1n}} = \frac{d_1}{d_1 + d_2};$$

$$d_1^2 = C_{cal}^2(R_0 - R_1);$$

$$d_2^2 = C_{cal}^2(R_0 - R_2);$$

wherein, $X_{tn}$ is an n-dimensional coordinate of the target device, $X_{1n}$ is an n-dimensional coordinate of a first auxiliary device, $X_{2n}$ is an n-dimensional coordinate of a second auxiliary device, $d_1$ is a corrected distance between the first auxiliary device and the target device, and $d_2$ is a corrected distance between the second auxiliary device and the target device; and use a mean coordinate value of the coordinate value of each dimensional coordinate of the target device calculated and acquired by using each corrected value to constitute a position coordinate of the position of the target device.

18. The apparatus according to claim 10, the apparatus is used in an indoor positioning scene.

* * * * *